(12) United States Patent  (10) Patent No.: US 9,176,685 B2
Kobayashi  (45) Date of Patent: Nov. 3, 2015

(54) COLOR CONVERTING APPARATUS AND COLOR CONVERTING METHOD FOR DESIGNATED-COLOR PRINTING, AND COMPUTER READABLE RECORDING MEDIUM

(71) Applicants: CASIO ELECTRONICS MANUFACTURING CO., LTD., Iruma-shi, Saitama-Ken (JP); CASIO COMPUTER CO., LTD., Shibuya-ku, Tokyo (JP)

(72) Inventor: Masaki Kobayashi, Higashiyamato (JP)

(73) Assignees: CASIO ELECTRONICS MANUFACTURING CO., LTD., Iruma-shi, Saitama-ken (JP); CASIO COMPUTER CO., LTD., Shibuya-ku, Tokyo (JP)

( * ) Notice: Subject to any disclaimer, the term of this patent is extended or adjusted under 35 U.S.C. 154(b) by 0 days.

(21) Appl. No.: 14/085,730

(22) Filed: Nov. 20, 2013

(65) Prior Publication Data

US 2014/0153009 A1  Jun. 5, 2014

(30) Foreign Application Priority Data

Nov. 30, 2012  (JP) ................................ 2012-263754

(51) Int. Cl.
*G06F 3/12* (2006.01)
*H04N 1/56* (2006.01)

(52) U.S. Cl.
CPC ............ *G06F 3/1208* (2013.01); *G06F 3/1244* (2013.01); *G06F 3/1284* (2013.01); *H04N 1/56* (2013.01)

(58) Field of Classification Search
CPC ... H04N 1/6058; H04N 1/40062; H04N 1/60; H04N 1/405
USPC .......... 358/1.9, 2.1, 3.01, 3.06, 3.1, 518, 520, 358/523, 534; 382/170; 347/188
See application file for complete search history.

(56) References Cited

U.S. PATENT DOCUMENTS 5,297,058 A * 3/1994 Samworth ..................... 382/167
6,538,762 B1 * 3/2003 Terashima et al. ........... 358/1.15
(Continued)

FOREIGN PATENT DOCUMENTS

JP  2005-167679 A  6/2005
JP  2005-328276 A  11/2005
(Continued)

OTHER PUBLICATIONS

Japanese Office Action dated Oct. 7, 2014, issued in counterpart Japanese Application No. 2012-263754.
(Continued)

*Primary Examiner* — Jamares Q Washington

(74) *Attorney, Agent, or Firm* — Holtz, Holtz, Goodman & Chick PC

(57) ABSTRACT

A color converting apparatus is used for designated-color printing. The apparatus is provided with a color space converting unit for converting a designated-color designated by a printing command to a converted-color in a color space represented by brightness, saturation and hue of color, and a color classifying unit for classifying the converted-color to one of plural classified-colors on the basis of the brightness, saturation and hue of said converted-color. Color correlating-relationship information is prepared, which sets correlating relationship between the plural classified-colors and one or more printing colors. The apparatus is further provided with a classified-color/printing-color correlating unit for selecting one printing color correlated with the one classified-color from among one or more printing colors, based on the color correlating-relationship information and for correlating the selected printing color with the printing command.

8 Claims, 21 Drawing Sheets

(56) References Cited

U.S. PATENT DOCUMENTS

| | | |
|---|---|---|
| 2007/0070466 A1 | 3/2007 | Okuyama |
| 2012/0307270 A1* | 12/2012 | Nakajima .................. 358/1.9 |

FOREIGN PATENT DOCUMENTS

| | | |
|---|---|---|
| JP | 2007097171 A | 4/2007 |
| JP | 2007228115 A | 9/2007 |
| JP | 4052415 B2 | 2/2008 |
| JP | 2008067068 A | 3/2008 |
| JP | 2009225451 A | 10/2009 |
| JP | 2010205016 A | 9/2010 |
| JP | 4921254 B2 | 4/2012 |

OTHER PUBLICATIONS

Japanese Office Action dated Jul. 15, 2014 issued in counterpart Japanese Application No. 2012-263754.

* cited by examiner

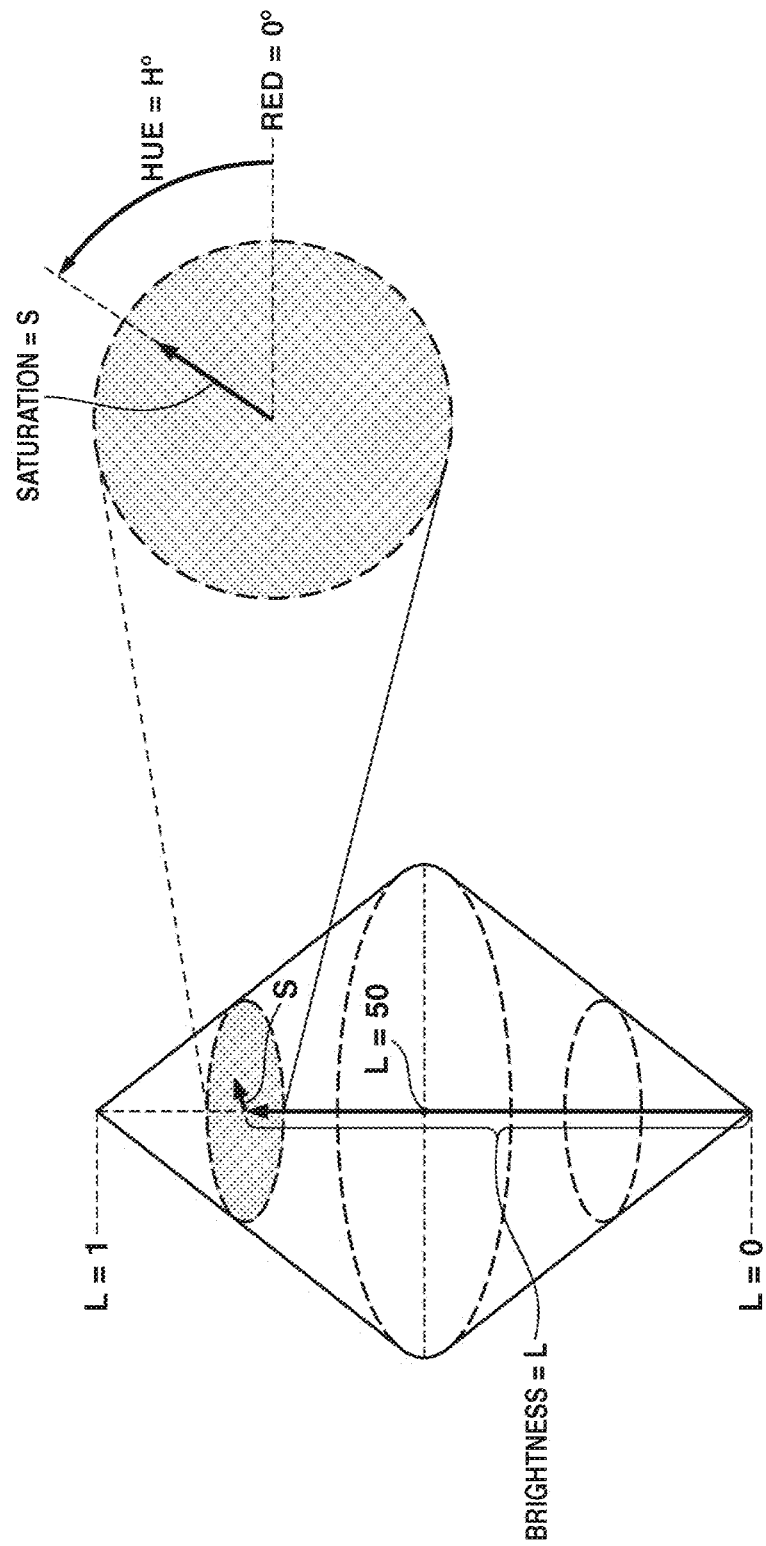

301 (BLACK) (L = 0 to Bla, for instance Bla = 0.01)

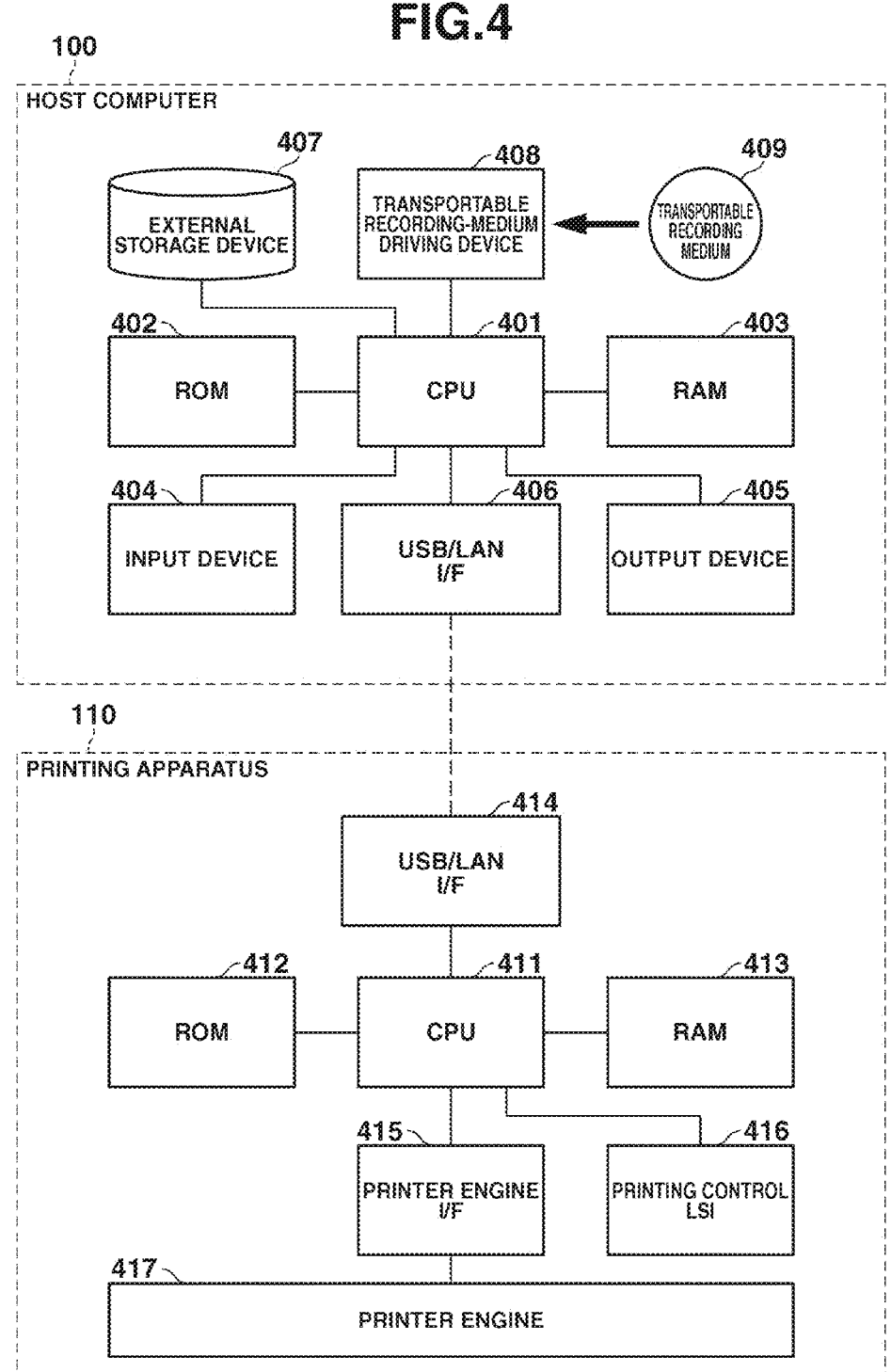

FIG.5

| THRESHOLD DATA | SETTING VALUE | THRESHOLD |
|---|---|---|
| Bla | 0.01 | BLACK-COLOR JUDGMENT THRESHOLD VALUE |
| Gry | 0.01 | GRAY-COLOR JUDGMENT THRESHOLD VALUE |
| RY | 52.5 | RED/YELLOW BORDER THRESHOLD VALUE |
| YG | 67.5 | YELLOW/GREEN BORDER THRESHOLD VALUE |
| GB | 180 | GREEN/BLUE BORDER THRESHOLD VALUE |
| BR | 300 | BLUE/RED BORDER THRESHOLD VALUE |
| R1 | 0 | RED/RED 2 BORDER THRESHOLD VALUE |
| R2 | 0 | RED 2/RED 3 BORDER THRESHOLD VALUE |

FIG.6

| Col (PRINTING COLOR) | STATION (TONER POSITION) | | TONER AMOUNT DENSITY (%) | NAME |
|---|---|---|---|---|
| | 0 | C | 0 | PRINTING COLOR 0 |
| | | M | 0 | |
| | | Y | 0 | |
| | | K | 100 | |
| | 1 | C | 100 | PRINTING COLOR 1 |
| | | M | 0 | |
| | | Y | 0 | |
| | | K | 0 | |
| | 2 | C | 0 | PRINTING COLOR 2 |
| | | M | 0 | |
| | | Y | 0 | |
| | | K | 0 | |
| | 3 | C | 0 | PRINTING COLOR 3 |
| | | M | 0 | |
| | | Y | 0 | |
| | | K | 0 | |
| | 4 | C | 0 | PRINTING COLOR 4 |
| | | M | 0 | |
| | | Y | 0 | |
| | | K | 0 | |
| | 5 | C | 0 | PRINTING COLOR 5 |
| | | M | 0 | |
| | | Y | 0 | |
| | | K | 0 | |
| | 6 | C | 0 | PRINTING COLOR 6 |
| | | M | 0 | |
| | | Y | 0 | |
| | | K | 0 | |
| | 7 | C | 0 | PRINTING COLOR 7 |
| | | M | 0 | |
| | | Y | 0 | |
| | | K | 0 | |

FIG. 7

[TEXT]

CONVERSION SORTS:
○ ALL TO BE CONVERTED TO "BLACK"
○ ALL TO BE CONVERTED TO "RED"
○ EXCEPT BLACK, ALL TO BE CONVERTED TO "RED"
● EXCEPT RED, ALL TO BE CONVERTED TO "BLACK"

COLOR DETAIL:  BLACK: ■ USE HALFTONE   ☐ MAINTAIN ORIGINAL DENSITY
               RED:   ■ USE HALFTONE   ☐ MAINTAIN ORIGINAL DENSITY

[GRAPHIC]

CONVERSION SORTS:
○ ALL TO BE CONVERTED TO "BLACK"
○ ALL TO BE CONVERTED TO "RED"
○ EXCEPT BLACK, ALL TO BE CONVERTED TO "RED"
● EXCEPT RED, ALL TO BE CONVERTED TO "BLACK"

COLOR DETAIL:  BLACK: ■ USE HALFTONE   ☐ MAINTAIN ORIGINAL DENSITY
               RED:   ■ USE HALFTONE   ■ MAINTAIN ORIGINAL DENSITY

CONVERSION SORTS:
● ALL TO BE CONVERTED TO "BLACK"
○ ALL TO BE CONVERTED TO "RED"
○ EXCEPT BLACK, ALL TO BE CONVERTED TO "RED"
○ EXCEPT RED, ALL TO BE CONVERTED TO "BLACK"

COLOR DETAIL:  BLACK: ■ USE HALFTONE   ■ MAINTAIN ORIGINAL DENSITY
               RED:   ☐ USE HALFTONE   ☐ MAINTAIN ORIGINAL DENSITY

FIG. 8

| | | CONVERSION SORTS | EXCEPT RED, ALL TO BE CONVERTED TO "BLACK" |
|---|---|---|---|
| TEXT | BLACK | USE HALFTONE | ON |
| | | MAINTAIN ORIGINAL DENSITY | OFF |
| | RED | USE HALFTONE | ON |
| | | MAINTAIN ORIGINAL DENSITY | OFF |
| | | CONVERSION SORTS | EXCEPT RED, ALL TO BE CONVERTED TO "BLACK" |
| GRAPHIC | BLACK | USE HALFTONE | ON |
| | | MAINTAIN ORIGINAL DENSITY | OFF |
| | RED | USE HALFTONE | ON |
| | | MAINTAIN ORIGINAL DENSITY | ON |
| | | CONVERSION SORTS | ALL TO BE CONVERTED TO "BLACK" |
| IMAGE | BLACK | USE HALFTONE | ON |
| | | MAINTAIN ORIGINAL DENSITY | ON |
| | RED | USE HALFTONE | - |
| | | MAINTAIN ORIGINAL DENSITY | - |

FIG.9

| CASE A: EXCEPT RED, ALL TO BE CONVERTED TO "BLACK" | | | DATA SET | | | | |
|---|---|---|---|---|---|---|---|
| | | | A0 | A1 | A2 | A3 | A4 |
| BLACK | USE HALFTONE | | ON | ON | OFF | ON | ON |
| | MAINTAIN ORIGINAL DENSITY | | OFF | ON | - | OFF | OFF |
| RED | USE HALFTONE | | ON | ON | ON | ON | OFF |
| | MAINTAIN ORIGINAL DENSITY | | OFF | OFF | OFF | ON | - |
| Cnv (CLASSIFIED COLORS) | 0 (BLACK) | Col | 0 | 0 | 0 | 0 | 0 |
| | | Gra | NO | NO | NO | NO | NO |
| | | Dns | NO | NO | NO | NO | NO |
| | 1 (GRAY) | Col | 0 | 0 | 0 | 0 | 0 |
| | | Gra | YES | YES | NO | YES | YES |
| | | Dns | NO | YES | NO | NO | NO |
| | 2 (RED) | Col | 1 | 1 | 1 | 1 | 1 |
| | | Gra | YES | YES | YES | YES | NO |
| | | Dns | NO | NO | NO | YES | NO |
| | 3 (GREEN) | Col | 0 | 0 | 0 | 0 | 0 |
| | | Gra | YES | YES | NO | YES | YES |
| | | Dns | NO | YES | NO | NO | NO |
| | 4 (BLUE) | Col | 0 | 0 | 0 | 0 | 0 |
| | | Gra | YES | YES | NO | YES | YES |
| | | Dns | NO | YES | NO | NO | NO |
| | 5 (YELLOW) | Col | 0 | 0 | 0 | 0 | 0 |
| | | Gra | YES | YES | NO | YES | YES |
| | | Dns | NO | YES | NO | NO | NO |
| | 6 (RED 2) | Col | 1 | 1 | 1 | 1 | 1 |
| | | Gra | YES | YES | YES | YES | NO |
| | | Dns | NO | NO | NO | YES | NO |
| | 7 (RED 3) | Col | 1 | 1 | 1 | 1 | 1 |
| | | Gra | YES | YES | YES | YES | NO |
| | | Dns | NO | NO | NO | YES | NO |

FIG.10

| CASE B: EXCEPT BLACK, ALL TO BE CONVERTED TO "RED" | | | DATA SET | | | | |
|---|---|---|---|---|---|---|---|
| | | | B0 | B1 | B2 | B3 | B4 |
| BLACK | USE HALFTONE | | ON | ON | OFF | ON | ON |
| | MAINTAIN ORIGINAL DENSITY | | OFF | ON | - | OFF | OFF |
| RED | USE HALFTONE | | ON | ON | ON | ON | OFF |
| | MAINTAIN ORIGINAL DENSITY | | OFF | OFF | OFF | ON | - |
| Cnv (CLASSIFIED COLORS) | 0 (BLACK) | Col | 0 | 0 | 0 | 0 | 0 |
| | | Gra | NO | NO | NO | NO | NO |
| | | Dns | NO | NO | NO | NO | NO |
| | 1 (GRAY) | Col | 0 | 0 | 0 | 0 | 0 |
| | | Gra | YES | YES | NO | YES | YES |
| | | Dns | NO | YES | NO | NO | NO |
| | 2 (RED) | Col | 1 | 1 | 1 | 1 | 1 |
| | | Gra | YES | YES | YES | YES | NO |
| | | Dns | NO | NO | NO | YES | NO |
| | 3 (GREEN) | Col | 1 | 1 | 1 | 1 | 1 |
| | | Gra | YES | YES | YES | YES | NO |
| | | Dns | NO | NO | NO | YES | NO |
| | 4 (BLUE) | Col | 1 | 1 | 1 | 1 | 1 |
| | | Gra | YES | YES | YES | YES | NO |
| | | Dns | NO | NO | NO | YES | NO |
| | 5 (YELLOW) | Col | 1 | 1 | 1 | 1 | 1 |
| | | Gra | YES | YES | YES | YES | NO |
| | | Dns | NO | NO | NO | YES | NO |
| | 6 (RED 2) | Col | 1 | 1 | 1 | 1 | 1 |
| | | Gra | YES | YES | YES | YES | NO |
| | | Dns | NO | NO | NO | YES | NO |
| | 7 (RED 3) | Col | 1 | 1 | 1 | 1 | 1 |
| | | Gra | YES | YES | YES | YES | NO |
| | | Dns | NO | NO | NO | YES | NO |

FIG.11

| CASE C: ALL TO BE CONVERTED TO "BLACK" | | | DATA SET | | |
|---|---|---|---|---|---|
| | | | C0 | C1 | C2 |
| BLACK | USE HALFTONE | | ON | ON | OFF |
| | MAINTAIN ORIGINAL DENSITY | | OFF | ON | - |
| RED | USE HALFTONE | | - | - | - |
| | MAINTAIN ORIGINAL DENSITY | | - | - | - |
| Cnv (CLASSIFIED COLORS) | 0 (BLACK) | Col | 0 | 0 | 0 |
| | | Gra | NO | NO | NO |
| | | Dns | NO | NO | NO |
| | 1 (GRAY) | Col | 0 | 0 | 0 |
| | | Gra | YES | YES | NO |
| | | Dns | NO | YES | NO |
| | 2 (RED) | Col | 0 | 0 | 0 |
| | | Gra | YES | YES | NO |
| | | Dns | NO | YES | NO |
| | 3 (GREEN) | Col | 0 | 0 | 0 |
| | | Gra | YES | YES | NO |
| | | Dns | NO | YES | NO |
| | 4 (BLUE) | Col | 0 | 0 | 0 |
| | | Gra | YES | YES | NO |
| | | Dns | NO | YES | NO |
| | 5 (YELLOW) | Col | 0 | 0 | 0 |
| | | Gra | YES | YES | NO |
| | | Dns | NO | YES | NO |
| | 6 (RED 2) | Col | 0 | 0 | 0 |
| | | Gra | YES | YES | NO |
| | | Dns | NO | YES | NO |
| | 7 (RED 3) | Col | 0 | 0 | 0 |
| | | Gra | YES | YES | NO |
| | | Dns | NO | YES | NO |

FIG.12

| CASE D: ALL TO BE CONVERTED TO "RED" | | | DATA SET | | |
|---|---|---|---|---|---|
| | | | D0 | D3 | D4 |
| BLACK | USE HALFTONE | | - | - | - |
| | MAINTAIN ORIGINAL DENSITY | | - | - | - |
| RED | USE HALFTONE | | ON | ON | OFF |
| | MAINTAIN ORIGINAL DENSITY | | OFF | ON | - |
| Cnv (CLASSIFIED COLORS) | 0 (BLACK) | Col | 1 | 1 | 1 |
| | | Gra | NO | NO | NO |
| | | Dns | NO | NO | NO |
| | 1 (GRAY) | Col | 1 | 1 | 1 |
| | | Gra | YES | YES | NO |
| | | Dns | NO | YES | NO |
| | 2 (RED) | Col | 1 | 1 | 1 |
| | | Gra | YES | YES | NO |
| | | Dns | NO | YES | NO |
| | 3 (GREEN) | Col | 1 | 1 | 1 |
| | | Gra | YES | YES | NO |
| | | Dns | NO | YES | NO |
| | 4 (BLUE) | Col | 1 | 1 | 1 |
| | | Gra | YES | YES | NO |
| | | Dns | NO | YES | NO |
| | 5 (YELLOW) | Col | 1 | 1 | 1 |
| | | Gra | YES | YES | NO |
| | | Dns | NO | YES | NO |
| | 6 (RED 2) | Col | 1 | 1 | 1 |
| | | Gra | YES | YES | NO |
| | | Dns | NO | YES | NO |
| | 7 (RED 3) | Col | 1 | 1 | 1 |
| | | Gra | YES | YES | NO |
| | | Dns | NO | YES | NO |

1802: CONVERT NOT BLACK BUT GREEN GRAPHIC TO RED

1801: MAINTAIN NOT BLACK BUT RED TEXT IN RED

1803: CONVERT ALL IMAGES TO BLACK

IN THE CASE WHERE
<EXCEPT BLACK, ALL TO BE CONVERTED TO "RED">
IS SET FOR TEXT AND GRAPHIC DATA, AND
<ALL TO BE CONVERTED TO "BLACK">
IS SET FOR IMAGE DATA

1902: CONVERT ALL GRAPHICS TO BLACK

1901: CONVERT ALL TEXTS TO RED

1903: CONVERT ALL IMAGES TO BLACK

IN THE CASE WHERE
<ALL TO BE CONVERTED TO "RED">
IS SET FOR TEXT DATA, AND
<ALL TO BE CONVERTED TO "BLACK">
IS SET FOR IMAGE AND GRAPHIC DATA

COLOR CONVERTING APPARATUS AND COLOR CONVERTING METHOD FOR DESIGNATED-COLOR PRINTING, AND COMPUTER READABLE RECORDING MEDIUM

CROSS-REFERENCE TO RELATED APPLICATION

The present application is based upon and claims the benefit of priority from the prior Japanese Patent Application No. 2012-263754, filed Nov. 30, 2012, the entire contents of which are incorporated herein by reference.

BACKGROUND OF THE INVENTION

1. Field of the Invention

The present invention relates to a color converting apparatus and color converting method for performing designated-color printing in a printing operation by a printing apparatus and to a computer readable recording medium for recording a program for designated-color printing.

2. Description of the Related Art

In general, the designated-color printing means printing using designated colors, and is used for printing a lot of advertisement leaflets and the like with saving toners and inks used in printing operation by printing apparatuses. For instance, two-color printing using two colors "red" and "black" is widely used.

As disclosed in Japanese Patent Publication No. 4,052,415, a technique of the two-color printing is known, in which printing colors such as a main and sub-main colors are designated by printing commands supplied from application program, and these colors are converted to a first and second ink colors set previously in a printing machine, and then printing commands including the printing-color information is sent to said printing machine.

In the above disclosed technique, information indicating correlation in color between the main and sub-main colors and the first and second ink colors is previously fixed by a user. When the printing command is output, it is detected whether the main color has been designated or whether the sub-main color has been designated. And then, the detected color is converted to the first or second ink color based on the information indicating the correlation previously fixed by the user.

Now, it is assumed that a user creates an object to be printed, including such as text, graphic and image data, and/or their combined data (hereinafter, referred to as "data-for-printing"), using plural colors on application software, and wants to print the created data-for-printing in designated-color printing using colors (for instance, "red" and "black") designated by the user. In this case, the plural colors designated by the printing commands to be used in color printing will include a so-called "full-color" or at least more than the number of printing colors used in the designated-color printing.

In the conventional technique, color conformation of a main color (for instance, "red") is detected from color information designated by the printing commands corresponding to the data-for-printing, and the detected color information is converted to color information of a first ink color (for instance, "red" ink color) of the printer. When color information of color other than the main color designated by the printing command is detected, the detected color information is converted to color information of a second ink color (for instance, "black" ink color) of the printer.

But the conventional technique can execute only a limited color designation, which correlates particular colors in the data-for-printing, for example, with either of colors used in the two-color printing. Therefore, the user is required to designate colors with using two-color printing in mind at the stage when he/she creates data-for-printing. As a result, the conventional technique has a problem that cannot easily print data-for-printing, such as previously prepared multicolor pamphlets in designated-color printing as the user desires.

SUMMARY OF THE INVENTION

According to one aspect of the invention, there is provided a color converting apparatus for designated-color printing, which comprises a color space converting unit, which converts a designated-color designated by a printing command to a converted-color in a color space represented by brightness, saturation and hue of color, a color classifying unit, which classifies the converted-color to one of plural classified-colors on the basis of the brightness, saturation and hue of said converted-color, and a classified-color/printing-color correlating unit, which selects one printing color correlated with the one classified-color from among one or more printing colors, based on color correlating-relationship information, wherein the color correlating-relationship information sets correlating relationship between the plural classified-colors and one or more printing colors, and correlates the selected printing color with said printing command.

According to other aspect of the invention, there is provided a method of converting color for designated-color printing, which comprises a color-space converting step of converting a designated-color designated by a printing command to a converted-color in a color space represented by brightness, saturation and hue of color, a color classifying step of classifying the converted-color to one of plural classified-colors on the basis of the brightness, saturation and hue of said converted-color, and a classified-color/printing-color correlating step of selecting one printing color correlated with the one classified-color from among one or more printing colors, based on color correlating-relationship information, wherein the color correlating-relationship information sets correlating relationship between the plural classified-colors and one or more printing colors, and of correlating the selected printing color with said printing command.

According to another aspect of the invention, there is provided a non-transitory computer-readable storage medium with an executable program stored thereon, wherein the program instructs a computer to perform the following steps: a color-space converting step of converting a designated-color designated by a printing command to a converted-color in a color space represented by brightness, saturation and hue of color; a color classifying step of classifying the converted-color to one of plural classified-colors on the basis of the brightness, saturation and hue of said converted-color; and a classified-color/printing-color correlating step of selecting one printing color correlated with the one classified-color from among one or more printing colors, based on color correlating-relationship information, wherein the color correlating-relationship information sets correlating relationship between the plural classified-colors and one or more printing colors, and of correlating the selected printing color with said printing command.

BRIEF DESCRIPTION OF THE DRAWINGS

FIG. 2 is a view for explaining HSL color space.

FIG. 4 is a view showing a hardware configuration of a printing system according to the present embodiment of the invention.

FIG. 5 is a view showing an example of a data configuration of threshold data for a color classification.

FIG. 6 is a view showing an example of a data configuration of printing-color setting data for setting printing colors.

FIG. 7 is a view showing an example of a configuration of a color setting window.

FIG. 8 is a view showing an example of a data configuration of color setting data.

FIG. 9 is a view showing an example of a data configuration of a classified-color/printing-color correlating table (case A).

FIG. 10 is a view showing an example of a data configuration of the classified-color/printing-color correlating table (case B).

FIG. 11 is a view showing an example of a data configuration of the classified-color/printing-color correlating table (case C).

FIG. 12 is a view showing an example of a data configuration of the classified-color/printing-color correlating table (case D).

DETAILED DESCRIPTION OF THE PREFERRED EMBODIMENTS

Figure 1:
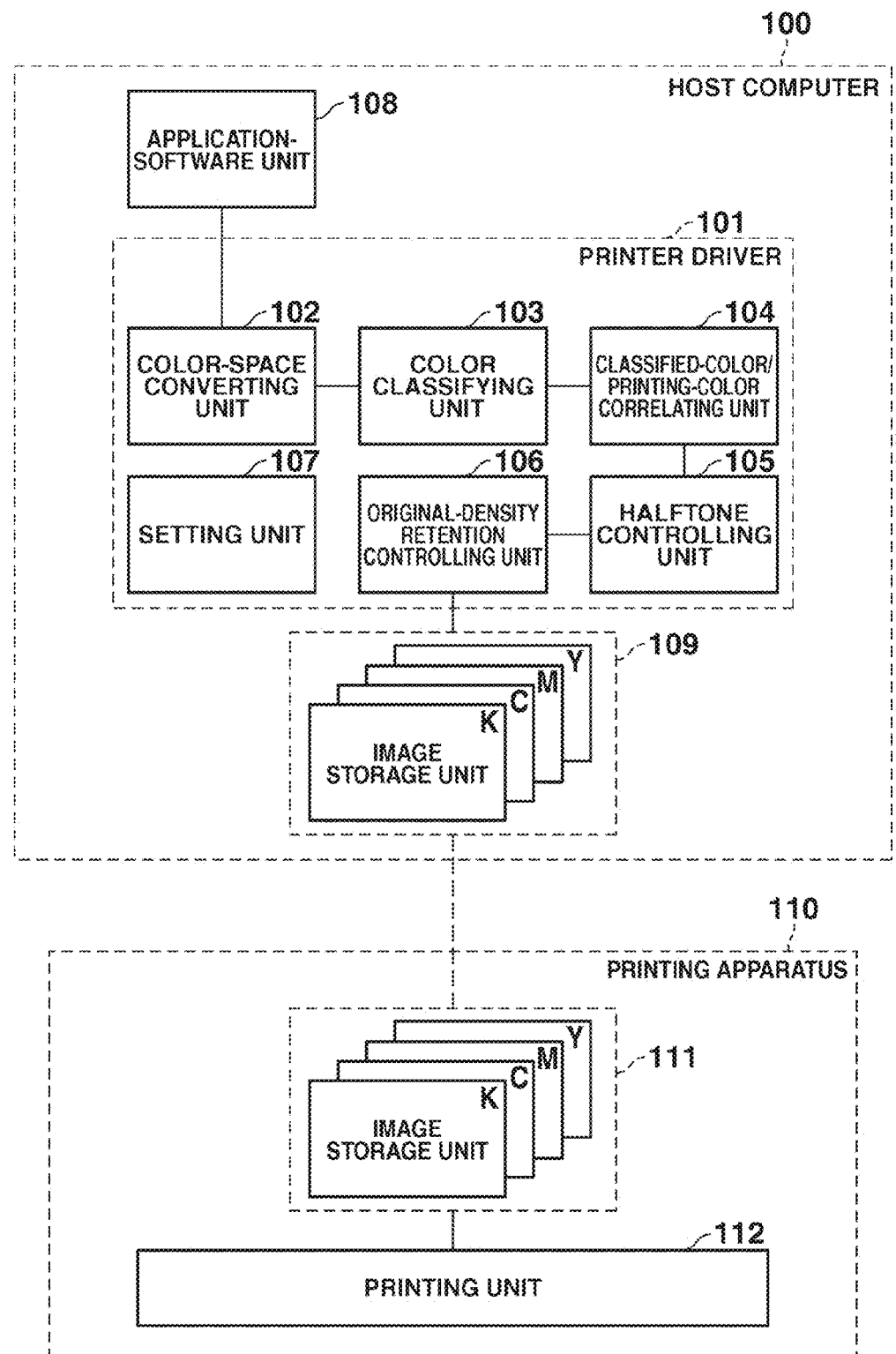
FIG. 1 is a block diagram of a color converting apparatus according to the embodiment of the invention.

Hereinafter, the preferred embodiments of the invention will be described with reference to the accompanying drawings in detail. FIG. 1 is a block diagram of a color converting apparatus according to the present embodiment of the invention.

In the present embodiment of the invention, a host computer 100 is connected to a printing apparatus 110, for example, through USB (Universal Serial Bus) cable or LAN (Local Area Network) connection (cable or wireless), as shown in FIG. 1.

The color converting apparatus according to the present embodiment is realized, for example, by a function of a part of a printer driver 101 running on the host computer 100.

In this case, a color converting function of the printer driver 101 processes printing commands supplied from an application unit 108, such as spreadsheet software or word-processor software to be performed on the host computer 100, thereby converting the color designated by the printing command to a printing color. Plural colors designated by the printing commands are a wide range of colors, or the number of designated colors is at least more than the number of classified colors or more than the number of printing colors to be designated for printing.

A printing-command executing function (not shown) of the printer driver 101 translates the printing commands, which have been converted to the printing colors, and expands printing image data corresponding to the printing commands on image memories assigned to the printing colors in an image storage unit 109. For instance, when the printing colors are two colors, such as Red and Black, two (red and black) pieces of printing image data are expanded on the image memory for K (black) station and the image memory for C (Cyan) station, respectively.

The printer driver 101 transfers the printing image data expanded on the image memories of the image storage unit 109 to the printing apparatus 110. The printing apparatus 110 is provided with an image storage unit 111, which is similar to the image storage unit 109 of the host computer 100. The respective pieces of printing image data expanded on the image memories of K station and C station in the image storage unit 109 of the host computer 100 are transferred respectively onto image memories of K station and C station in the image storage unit 111 of the printing apparatus 110. The image memories of the respective stations in the image storage unit 111 of the printing apparatus 110 correspond respectively to toner colors, which a printing unit 112 uses in a printing operation. In two-color printing operation, black-colored toner and red-colored toner are set respectively to K station and C station in the printing unit 112. Therefore, in the printing unit 112, the printing image data transferred to K station of the image storage unit 111 is printed in a printing color of black and the printing image data transferred to C station of the image storage unit 111 is printed in a printing color of red.

The color converting apparatus realized as the function of the printer driver 101 has the following configuration.

A color-space converting unit 102 receives a printing command from an application-software unit 108 and converts a color represented by the received printing command to a color in the color space represented by three attributes: Hue, Saturation, and Brightness. The color space is HSL (which is often also called HLS) color space. HSL stands for "Hue", "Saturation", and "Lightness/Luminance, or Intensity".

A color classifying unit 103 classifies the converted color to one of plural classified colors based on the attributes of color, Hue, Saturation and Brightness of color. For example, when the converted color is not larger in brightness than a predetermined threshold value of brightness, the color classifying unit 103 classifies said converted color to a classified color of black. For instance, when the converted color is larger in brightness than the predetermined threshold value of brightness, and is not larger in saturation than a predetermined threshold value of saturation, the color classifying unit 103 classifies said converted color to a classified color of gray. Further, when the converted color is larger in brightness than the predetermined threshold value of brightness, and is also larger in saturation than the predetermined threshold value of saturation, the color classifying unit 103 classifies a color converted based on hue of said converted color to plural classified colors (for instance, red, yellow, green, and blue) other than black and gray.

A classified-color/printing-color correlating unit 104 determines one printing color correlated with one classified color out of one or more printing colors, based on color correlating-relationship information, which sets correlating relationship between plural classified colors and one or more printing colors, and outputs the determined printing color in association with the received printing command.

Further, the printer driver 101 can be provided with a halftone controlling unit 105 that calculates a printing density of the printing color, based on the brightness in the color space of the classified color classified by the color classifying unit 103 to be converted to said printing color, and sets the calculated printing density for said printing color, when it is previously set that a halftone printing color is used with respect to each printing color.

Further, the printer driver 101 according to the present embodiment of the invention can be provided with an original-density retention controlling unit 106, which multiplies the calculated printing density by a predetermined constant corresponding to the classified color classified by the color classifying unit 103, thereby setting the resultant printing density for the printing color, when it is previously set that a halftone printing color is used with respect to each printing color and further it has been set that the original density of the classified color classified by the color classifying unit 103 to be converted to the printing color is to be retained.

In addition, the printer driver 101 can be provided with a setting unit 107. The setting unit 107 has a function of a color correlating-relationship information setting unit, which sets the color correlating-relationship information used by the classified-color/printing-color correlating unit 104. The setting unit 7 also has a function of a halftone setting unit, which decides with respect to each printing color, whether a halftone printing color is to be used or not. Further, when it is previously set that a halftone printing color is used with respect to each printing color, the setting unit 7 functions as an original-density retention setting unit, which decides whether the original density of the classified color classified by the color classifying unit 103 to be converted to the printing color is to be retained or not.

The respective functions of the color-space converting unit 102, the color classifying unit 103, the classified-color/printing-color correlating unit 104, the halftone controlling unit 105, the original-density retention controlling unit 106 and the setting unit 107 shown in FIG. 1 are realized by the host computer 100, but it is possible to realize these functions by functions on the printing apparatus 110, which process the printing command supplied from the host computer 100 or printing command generated by processing data-for-printing stored in a recording medium (not shown) connected to the printing apparatus 110.

FIG. 2 is a view for explaining HSL color space converted by the color-space converting unit 102. For instance, the relationship between "Brightness" L, "Hue" H, and "Saturation" S in HSL color space is shown by a double-cone, as shown in FIG. 2.

"Brightness" L corresponds to luminance of color in human sense of color. If "Brightness" L of color is high, a human feels the color as light color. On the contrary, if "Brightness" L of color is low, a human feels the color as dark color. If "Brightness" L of color is very low, a human feels the color as almost black color. When "Brightness" L of color is at 0 (L=0), the color is black, and when "Brightness" L of color is at 1 (L=1), the color is white.

"Saturation" S corresponds to clearness or vividness of color in human sense of color. If "Saturation" S of color is high, then a human feels the color as clear or vivid color. On the contrary, if "Saturation" S of color is low, then a human feels the color as dull color. If "Saturation" S of color is very low, then a human feels the color as almost gray color.

As will be understood from the double-cone shown in FIG. 2, the range of "Saturation" S will be defined by "Brightness" L. In the example shown in FIG. 2, "Saturation" S will take its maximum value (maximum saturation value) when the Brightness L is at 0.5. As the Brightness L decreases to 1 or 0, the range of the Saturation value will become decreased.

Hue H corresponds to the sorts of color in human sense of color. Hue H is defined by the angle ranging from 0 deg. to 360 deg. inclusive. Around at Hue angle of 0 deg. or 360 deg., a human feel the color as color close to red. Around at Hue angle of 60 deg., a human feel the color as color close to yellow. Around at Hue angle of 120 deg., a human feel the color as color close to green. Around at Hue angle of 240 deg., a human feel the color as color close to blue.

Figure 3A:
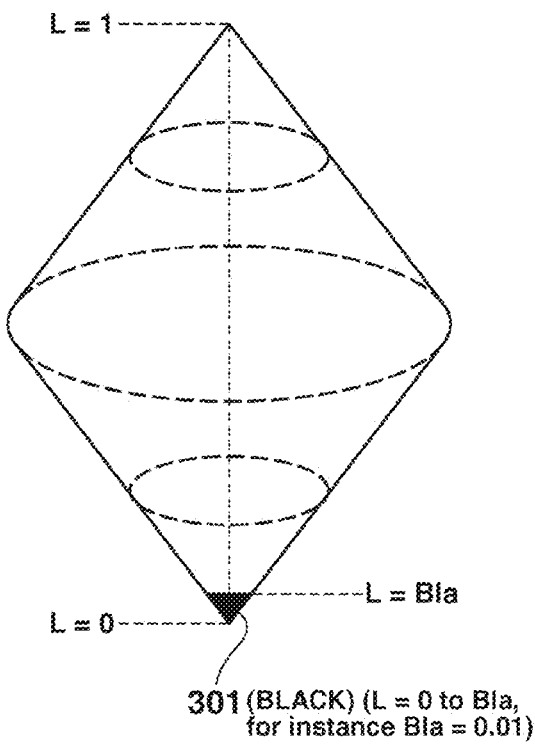
FIG. 3A and FIG. 3B are views for explaining a color classification in the present embodiment of the invention.
Figure 3B:
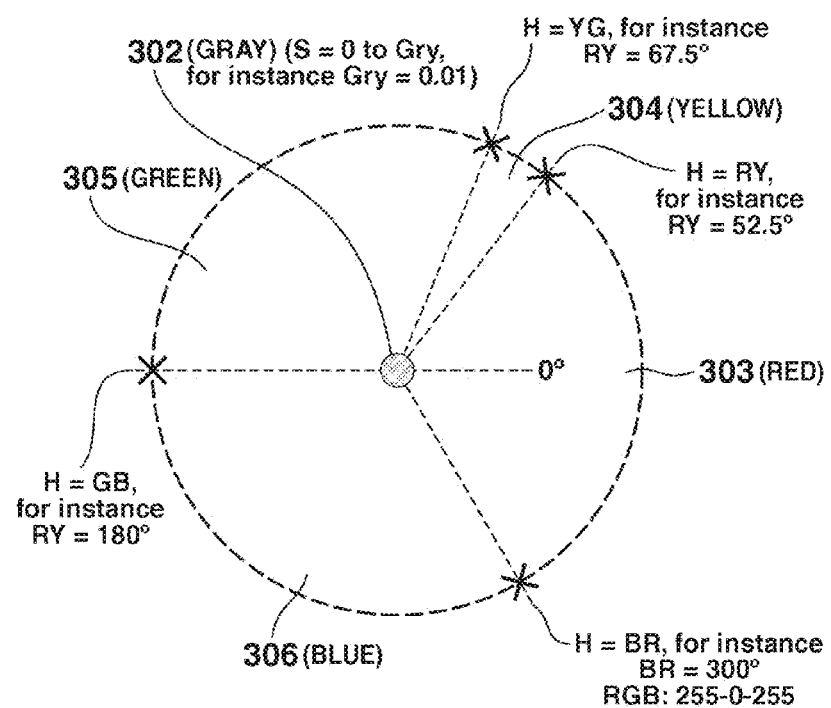

The color-space converting unit 102 of FIG. 1 converts, for example, a color designated by the printing command in RGB color space to a color in HSL color space. Further, the color classifying unit 103 classifies the converted color in HSL color space with the reference to "Brightness" L, "Saturation" S, and "Hue" H, as follows:

FIG. 3A and FIG. 3B are views for explaining a color classification in the present embodiment of the invention.

For example, when the brightness L (defined in FIG. 2) of the converted color falls in a range 301 ($0 \leq L \leq Bla$), which is not larger than a predetermined black-color judgment threshold value (brightness threshold value) Bla, as shown in FIG. 3A, the color classifying unit 103 classifies the converted color to a classified color of "black". The black-color judgment threshold value Bla is, for instance, around 0.01.

Therefore, when the brightness L of the color designated by the printing command is very low, the color can be classified to a color of "black" in a similar manner to the human sense of color.

For example, when the brightness L of the converted color is higher than the black-color judgment threshold value Bla, and when saturation S (defined in FIG. 2) of the converted color falls in a range 302 ($0 \leq S \leq Gry$), which is not larger than a predetermined gray-color judgment threshold value (saturation threshold value) Gry, as shown in FIG. 3B, the color classifying unit 103 classifies said converted color to a classified color of "gray". The gray-color judgment threshold value Gry is, for instance, around 0.01.

Therefore, when the saturation S of the color designated by the printing command is very low, the color can be classified to a color of "gray" in a similar manner to the human sense of color.

Further, for example, when the brightness L of the converted color is higher than the black-color judgment threshold value Bla, and when the saturation S of the converted color is higher than the gray-color judgment threshold value Gry, the color classifying unit 103 classifies the converted color to plural classified colors (for instance, "red", "yellow", "green", "blue") other than "black" and "gray", based on "Hue" H of the converted color defined in FIG. 2.

More specifically, when "Hue" H of the converted color is not lower than a predetermined red/yellow border threshold value RY and falls in a range 304 lower than a predetermined yellow/green border threshold value YG, as shown in FIG. 3B, the color classifying unit 103 classifies the converted color to a color of "yellow". The red/yellow border threshold value RY is, for example, around 52.5 deg. and RGB: 255-223-0 at the brightness L=0.5 in RGB color space. The yellow/green border threshold value YG is, for instance, 67.5 deg. and RGB: 223-255-0 at the brightness L=0.5 in RGB color space.

When "Hue" H of the converted color is not lower than a predetermined yellow/green border threshold value YG and falls in a range 305 lower than a predetermined green/blue border threshold value GB, as shown in FIG. 3B, the color classifying unit 103 classifies the converted color to a color of "green". The green/blue border threshold value GB is, for example, around 180 deg. and RGB: 0-255-255 at the brightness L=0.5 in RGB color space.

Further, when "Hue" H of the converted color is not lower than a predetermined green/blue border threshold value GB and falls in a range 306 lower than a predetermined blue/red border threshold value BR, as shown in FIG. 3B, the color classifying unit 103 classifies the converted color to a color of "blue". The blue/red border threshold value BR is, for example, around 300 deg. and RGB: 255-0-255 at the brightness L=0.5 in RGB color space.

Further, when "Hue" H of the converted color falls in a range other than the mentioned above, that is, falls in a range 303 from the predetermined blue/red border threshold value BR to 0 deg. and from 0 deg. to the predetermined red/yellow border threshold value RY, as shown in FIG. 3B, the color classifying unit 103 classifies the converted color to a color of "red".

Further, in the present embodiment of the invention, there are prepared classified colors "red 2" and "red 3", such that colors of "normal red" and "dark red" are classified to the classified colors "red 2" and "red 3", respectively. After classifying a color of red, when the brightness L of the converted color is not lower than a predetermined red/red-2 border threshold value R1, the color classifying unit 103 classifies the final classified color to "red". Further, after classifying the color of red, when the brightness L of the converted color is lower than the predetermined red/red-2 border threshold value R1, and is not lower than the predetermined red-2/red-3 border threshold value R2, the color classifying unit 103 classifies the final classified color to "red 2", which is darker than "red". Further, after classifying the color of red, when the brightness L of the converted color is lower than the predetermined red-2/red-3 border threshold value R2, the color classifying unit 103 classifies the final classified color to "red 3", which is darker than "red 2". When the classified colors of "red 2" and "red 3" are not used, the red/red-2 border threshold value R1 and red-2/red-3 border threshold value R2 are set to 0.

When the brightness L of the color designated by the printing command is higher than the black-color judgment threshold value Bla and the saturation S falls in a range higher than the gray-color judgment threshold value Gry, the color classifying unit 103 classifies the color to red, yellow, green and blue in a similar sense to human sense of color.

In the present embodiment of the invention, color correlating-relationship information is set, which represents that is, color correlating-relationship between plural classified colors classified in accordance with human sense in HSL color space and one or more printing colors, which can be printed by the printing unit 112 of the printing apparatus 110.

A user is allowed to set this color correlating-relationship information, for instance, on a displaying screen of the host computer 100 using the setting unit 107 of FIG. 1. Since a classified color can be designated according to reference depending on the human sense, it is possible for the user to intuitively make a color in the human sense such as black color, gray color, red color, yellow color, green color and blue color in data-for-printing relate to any printing color such as red color and black color.

Based on the color correlating-relationship information designated according to the user's desire, the classified-color/printing-color correlating unit 104 of FIG. 1 selects one printing color associated with the classified color classified by the color classifying unit 103 out of one or more printing colors, and outputs the selected printing color associated with the entered printing command. As a result, data-for-printing such as pamphlets including plural colors can be printed with colors designated by the user according to his/her desire.

In the present embodiment of the invention, the setting unit 107 can decide with respect to each printing color whether a halftone printing color is used. When it has been set that a halftone printing color is used, the halftone controlling unit 105 of FIG. 1 calculates a printing density of the printing color, based on the brightness L in the color space of the classified color, which is to be converted to said printing color and is classified by the color classifying unit 103, and sets the calculated printing density for the printing color.

In a color-designated printing, sometimes the user wants to use a printing color of red (or black) to print in a natural halftone gradation. In the present embodiment, it is focused on that a human being takes a halftone of color as the brightness of the color, and a printing density of a printing color is controlled, depending on the brightness L of the color converted from an original color by the printing command corresponding to the printing color, for example, in HSL color space, which is defined with reference to FIG. 2. In this way, the color designated printing can be realized using the halftone printing color as the user desired.

When the classified color to be converted to the printing color is black or gray, the brightness L to be controlled as a halftone will range from 0 to 1 ($0 \leq L \leq 1$). On the contrary, when the classified color to be converted to the printing color is a color such as red, yellow, green, or blue other than black or gray, the brightness L to be controlled as a halftone ranges from 0.5 to 1 ($0.5 \leq L \leq 1$), wherein the saturation S of these colors is highest at L=0.5 and white at L=1. Then, in the present embodiment, the range of the brightness L for controlling the printing density varies in accordance with the classified color, whereby a natural gradation will be realized with respect to each printing color.

Further, in the present embodiment, when it has been set by the setting unit 107 that a halftone of a printing color is used and the original density of the classified color to be converted to said printing color is to be maintained, the printing density can be adjusted by multiplying the printing density of the printing color calculated as the halftone by a predetermined coefficient corresponding to the classified color converted to the printing color.

Some users want to match the printing density of the printing color faithfully to the original brightness L of the classified color to be converted to the printing color. In this case, setting to maintain the original density, the setting unit 107 can perform the halftone printing as the user wants.

As has been described with reference to FIG. 1 to FIG. 3B, the data-for-printing, in which plural colors are designated by the printing commands, can be printed in the color designated printing as the user desires in the present embodiment of the invention.

FIG. 4 is a view showing a hardware configuration of a printing system according to the present embodiment of the invention. The printing system comprises the host computer 100 and the printing apparatus 110, realizing the function of the present embodiment of the invention, shown in FIG. 1.

The host computer 100 is provided with CPU 401, ROM 402, RAM 403, an input device 404, an output device 405, USB or LAN interface (hereinafter, "USB/LAN I/F") 406, an external storage device 407, and a transportable recording-medium driving device 408 for driving a transportable recording medium 409. These units are connected to each other through a bus.

The host computer 100 shown in FIG. 4 is an example of a host computer, which can realize the printing system of the present embodiment of the invention, and is not limited to the particular embodiments described herein.

CPU 401 controls the whole operation of the host computer 100. When data is updated and a program is run, RAM (Random Access Memory) 403 serves to temporarily store such data and program, which are stored in ROM (Read Only Memory) 402, and/or in the external storage device 407 (or the transportable recording medium 409).

CPU 401 reads programs for the printer driver 101 and application-software unit 108 from ROM 402 or from the external storage device 407 (or from the transportable recording medium 409) onto RAM 403, thereby controlling the whole operation of the host computer 100.

In RAM 403 are secured image memory areas of the image storage unit 109 of FIG. 1 for storing printing image data to be transferred to the printing apparatus 110.

The input device 404 is operated by the user to input various instructions to the host computer 100, when the printer driver 101 and/or the printing apparatus 110 are operated. The output device 405 is a displaying device, which is used for displaying data to be executed and input instructions.

The external storage device 407 is a hard disk storage device and/or a solid-state disk storage device for storing program data and other various sorts of data for the printer driver 101 and the application-software unit 108 of FIG. 1.

The transportable recording-medium driving device 408 receives the transportable recording medium 409 such as an optical disk, SDRAM, and a compact Flash (Registered Trademark), and serves as an auxiliary device of the external storage device 407. The transportable recording-medium driving device 408 is used to install various sorts of programs of printer driver 100 and the application-software unit 108.

USB/LAN I/F 406 is a device, which serves to connect USB (Universal Serial Bus) and/or WiFi wireless communication circuits. The host computer 100 and the printing apparatus 110 are connected to each other through USB/LAN I/F 406.

In the present embodiment of the invention, CPU 401 runs a program having the function of the printer driver 101 of FIG. 1 to realize the printing system. The printer driver 101 of FIG. 1 uses data configurations shown in FIG. 8 to FIG. 12 and operates in accordance with flow charts of FIG. 13 and FIG. 14. The program can be distributed, recorded in the external storage device 407 and/or on the transportable recording medium 409, or can be obtained through USB/LAN I/F 406 or a network such as the Internet.

The printing apparatus 110 is provided with CPU 411, ROM 412, RAM 413, USB/LAN I/F 414, a printer engine interface (hereinafter, "printer engine I/F") 415, a printing control LSI 416, and a printer engine 417. These units are connected to each other through a bus.

The printing apparatus 110 shown in FIG. 4 is an example of a printing apparatus, which can realize the printing system of the present embodiment of the invention, and is not limited to the particular embodiments described herein.

CPU 411 controls the whole operation of the printing apparatus 110. When data is updated and a printing control program is run, RAM (Random Access Memory) 403 serves to temporarily store such data and program, which are stored in ROM 412.

CPU 411 reads the printing control program from ROM 412 onto RAM 413, thereby controlling the whole operation of the printing apparatus 110.

In RAM 413 are secured image memory areas of the image storage unit 111 of FIG. 1 for storing printing image data transferred from the host computer 100 to the printing apparatus 110.

USB/LAN I/F 414 is a device, which serves as the same manner as USB/LAN I/F 406 of the host computer 100 to connect radio communication circuits.

The printing image data stored in the image memory areas of RAM 403 (corresponding to the image storage unit 109 of FIG. 1) in the host computer 100 is sent to the printing apparatus 110 through USB/LAN I/F 406. In the printing apparatus 110, the printing image data is written, under control of CPU 411, onto the image memory areas of RAM 413 (corresponding to the image storage unit 111 of FIG. 1) through USB/LAN I/F 414. Thereafter, the printing control LSI 416 transfers the printing image data written onto the image memory areas of RAM 413 to the printer engine 417 through the printer engine I/F 415.

The printer engine 417 is provided with a printing mechanism, which uses toners corresponding respectively to the image memory areas to perform a printing process in an overlapping manner on the printing image data transferred from the image memory areas of RAM 413.

FIG. 5 is a view showing an example of a data configuration of threshold data for a color classification. Threshold values such as the black-color judgment threshold value Bla, the gray-color judgment threshold value Gry, the red/yellow border threshold value RY, the yellow/green border threshold value YG, the green/blue border threshold value GB, the blue/red border threshold value BR, the red/red-2 border threshold value R1 and the red-2/red-3 border threshold value R2, shown in FIGS. 3A and 3B are recorded in the external storage device 407 or in RAM 403. CPU 401 of FIG. 4 designates the name of the threshold data to read the corresponding setting value. A term of "Meanings of threshold values" shown in FIG. 5 is given for explanation of the embodiment of the invention.

The setting values of the threshold data shown in FIG. 5 can be previously recorded as fixed values in ROM 402 or in the external storage device 407, at the time when the printing system is constructed. Meanwhile, it is also possible to prepare a setting file, which allows the user to alter the setting values of the threshold data according to his/her desire. Further, when the user is allowed to alter the threshold data, the classifying reference of classified colors (described with reference to FIGS. 3A and 3B) can be altered by the user without any restriction so as to meet his/her requirement.

FIG. 6 is a view showing an example of a data configuration of printing-color setting data for setting printing colors. In the present embodiment of the invention, 8 colors, Col=0 to 7, can be designated as printing color data Col to be converted from the classified colors, and 4 station positions (toner positions) C, M, Y, and K of toner concentration values (percent) are set for each printing color. In other words, the printer engine 417 of FIG. 4 is constructed such that, for instance, 4 toner cartridges corresponding respectively to the station positions C, M, Y, and K can be installed on. When a printing operation of two printing colors is performed as will be described in the present embodiment, a toner corresponding to the printing color of "black" is installed on the toner position corresponding to K station, a toner corresponding to the printing color of "red" is installed on the toner position corresponding to C station, and no toner is installed on the toner positions corresponding to M and Y stations in the printer engine 417. The combination of toners is not limited to the particular embodiments described herein.

In the example given in FIG. 6, the printing color data, Col=0 corresponds, for example, to the printing color of "black", and the toner concentration value of K station is set to 100%, and the toner concentration values of other stations C, M and Y are set to 0%. The printing color data, Col=1 corresponds, for example, to the printing color of "red", and the toner concentration value of C station is set to 100%, and the toner concentration values of other stations M, Y and K are set to 0%. Concerning other printing color data, Col=2 to 7, the toner concentration values of all the stations are set to 0%, and no toner is used.

The toner concentration values given respectively to plural pieces of printing color data Col (0 to 7) and stations (C, M, Y and K), as shown in FIG. 6 are stored in the external storage device 407 or in RAM 403 (FIG. 4). CPU 401 of FIG. 4 can designate the printing color data Col (0 to 7) and read the toner concentration value of the corresponding station (C, M, Y and K). The term of "name" in the printing color data of FIG. 6 is given only for convenience in the explanation of the embodiment of the invention.

FIG. 7 is a view showing an example of a configuration of a color setting window, which is realized as the function of the setting unit 107 of the printer driver 101 of FIG. 1. CPU 401 of FIG. 4 runs a color-setting window controlling program (not shown) to display the color setting window (shown in FIG. 7) on a display screen of the output device 405 of FIG. 4. The user is allowed to decide color settings on the color setting window by operating the input device 404 (keyboard and/or mouse).

On the color setting window shown in FIG. 7, the user can select and set either one of the following four correlating sorts (conversion sorts):
<All to be converted to "black">
<All to be converted to "red">
<Except black, all to be converted to "red">
<Except red, all to be converted to "black">
with respect to each of the text data, graphic data, and image data contained in the data-for-printing produced by the application-software unit 108 of FIG. 1.

In the color setting window shown in FIG. 7, the black circle attached at the head of a conversion sort means that said conversion sort has been selected by the user and the conversion sort with the white circle attached at the head has not been selected by the user.

The color setting window shown in FIG. 7 shows that the conversion sort of <Except red, all to be converted to "black"> has been selected for the text data and the graphic data, and the conversion sort of <All to be converted to "black"> has been selected for the image data.

Further, concerning colors of "black" and "red", the user can select and set either one of the following "color details" in the color setting window:
<Use halftone>
<Maintain original density>

In the color setting window shown in FIG. 7, the black square attached at the head of the "color detail" means that said color detail has been selected by the user, and the "color detail" with the white square attached at the head has not been selected by the user.

In the example shown in the color setting window of FIG. 7, the color detail of <Use halftone> has been set for "black" and "red" with respect to the text data and graphic data, and the color detail of <Use halftone> has been set only for "black" and the color detail of <Use no halftone> has been set for "red" with respect to the image data.

Further, with respect to the text data, the color detail of <Maintain no original density> has been set for "black" and "red". For the graphic data in the color setting window, the color detail of <Maintain original density> is set only for "red". For the image data in the color setting window, the color detail of <Maintain original density> is set only for "black".

In the present embodiment, in the case where the color detail of <Use halftone> has not been set, the display is arranged such that the color detail of <Maintain original density> cannot be set by the user. In other words, it is possible to set the color detail of <Maintain original density> or not, only when the color detail of <Use halftone> has been set.

The color setting window shown in FIG. 7 means that, when printing command of some data-for-printing comes out from the application-software unit 108 of FIG. 1 and said printing command is to give an instruction of printing text data, the user has given the following instruction. That is, when a reddish color has been designated as an original designated color among the printing commands, the printing color of "red" will be designated, and when a similar color other than the reddish colors has been designated among the printing commands, the printing color of "black" will be designated. The printing colors of "black" and "red" are controlled and will be printed in a natural halftone gradation.

When said printing command is to give an instruction of printing graphic data, the color setting window shown in FIG. 7 means that the user has given the following instruction. That is, when a reddish color has been designated as the original designated color among the printing commands, the printing color of "red" will be designated, and when a similar color other than the reddish colors has been designated among the printing commands, the printing color of "black" will be designated. The printing colors of "black" and "red" are controlled and will be printed in a natural halftone gradation. Further, the printing color of "red" is controlled to maintain the original density.

Further, when said printing command is to give an instruction of printing image data, the color setting window shown in FIG. 7 means that the user has given the following instruction. Even if any color has been designated as the original designated color among the printing commands, the printing color of "black" will be designated. The printing color of "black" is controlled and will be printed in a natural halftone gradation, and further controlled to maintain the original density.

FIG. 8 is a view showing an example of a data configuration of color setting data, which has been set by the user on the color setting window. The color setting data composes a part of the color correlating-relationship information described with reference to FIG. 1.

Based on the color settings shown in FIG. 7, the following data is recorded for the test data, graphic data, and image data. At first, either one of the following four conversion sorts (correlating sorts) is set:
<All to be converted to "black">
<All to be converted to "red">
<Except black, all to be converted to "red">, or
<Except red, all to be converted to "black">.

Then, with respect to each of the printing colors of "black" and "red", the following conditions: <Use halftone> ("ON" or "OFF") and/or <Maintain original density> ("ON" or "OFF") are set.

The color setting data is recorded in the external storage device 407 or in RAM 403 (both in FIG. 4). CPU 401 of FIG. 4 can read whether <Use halftone> has been set or not, and further can read whether <Maintain original density> has been set or not, by designating one of the test data, graphic data and image data, and further designating one of the printing colors of "black" and "red".

FIG. 9 to FIG. 12 are views showing examples of data configurations of classified-color/printing-color correlating tables. The data given in the tables composes a part of the color correlating-relationship information described with reference to FIG. 8.

FIG. 9 is a view showing the classified-color/printing-color correlating table, which contains a data set group to be referred to in the case of A, where the conversion sort (correlating sort) of <Except red, all to be converted to "black"> has been set regardless of the text data, graphic data, and image data in the color setting data of FIG. 8.

FIG. 10 is a view showing the classified-color/printing-color correlating table, which contains a data set group to be referred to in the case of B, where the conversion sort (correlating sort) of <Except black, all to be converted to "red"> has been set regardless of the text data, graphic data, and image data in the color setting data of FIG. 8.

FIG. 11 is a view showing the classified-color/printing-color correlating table, which contains a data set group to be referred to in the case of C, where the conversion sort (correlating sort) of <All to be converted to "black"> has been set regardless of the text data, graphic data, and image data in the color setting data of FIG. 8.

FIG. 12 is a view showing the classified-color/printing-color correlating table, which contains a data set group to be referred to in the case of D, where the conversion sort (correlating sort) of <All to be converted to "red"> has been set regardless of the text data, graphic data, and image data in the color setting data of FIG. 8.

In the classified-color/printing-color correlating tables shown in FIG. 9 to FIG. 12, concerning the classified-color data Cnv, 0 ("black"), 1 ("gray"), 2 ("red"), 3 ("green"), 4 ("blue"), 5 ("yellow"), 6 ("red 2"), or 7 ("red 3"), which correspond to the designated color designated by the entered printing command, the following data is set, wherein the classified-color data Cnv has been described with reference to FIGS. 3A and 3B. At first, the printing color data Col is set, which indicates, to which printing color (Refer to FIG. 6) the designated classified color Cnv should be converted. Further, values of the term of Gra, "YES" or "NO", are set, which indicate whether a halftone controlling process should be performed on the designated classified color or not. Finally, values of the term of Dns, "YES" or "NO", are set, which indicate whether an original-density maintaining control process should be performed on the designated classified color or not.

In each of the classified-color/printing-color correlating tables shown in FIG. 9 to FIG. 12, 5 data sets A0, A1, A2, A3, and A4 are prepared, regardless of the text data, graphic data, and image data in the color setting data of FIG. 8, for each of combinations of the following four conditions: concerning the printing color of "black",
(1) whether the color detail of <Use halftone> has been set ("ON") or not ("OFF");
(2) whether the color detail of <Maintain original density> has been set ("ON") or not ("OFF");
and, further concerning the printing color of "red",
(3) whether the color detail of <Use halftone> has been set ("ON") or not ("OFF"); and
(4) whether the color detail of <Maintain original density> has been set ("ON") or not ("OFF").

In the case of A shown in FIG. 9, 5 data sets A0, A1, A2, A3 and A4 are prepared. In the data sets A1, A2, A3 and A4, darker-shaded items show that said items are altered from the corresponding values in the first data set A0 in the case of A.

In the case of B shown in FIG. 10, 5 data sets B0, B1, B2, B3 and B4 are prepared. In the data set B0, the darker-shaded items show that said items are altered from the corresponding values in the data set A0 in the case A of FIG. 9. Further, in the data sets B1, B2, B3 and B4, the darker-shaded items show that said items are altered from the corresponding values in the first data set B0 in the case of B.

In the case of C shown in FIG. 11, 3 data sets C0, C1 and C2 are prepared. In the data set C0, the darker-shaded items show that said items are altered from the corresponding values in the data set A0 in the case A of FIG. 9. Further, in the data sets C1 and C2, the darker-shaded items show that said items are altered from the corresponding values in the first data set C0 in the case of C.

In the case of D shown in FIG. 12, 3 data sets D0, D3 and C4 are prepared. In the data set D0, the darker-shaded items show that said items are altered from the corresponding values in the data set A0 in the case A of FIG. 9. Further, in the data sets D3 and D4, the darker-shaded items show that said items are altered from the corresponding values in the first data set D0 in the case of D.

The case of A in FIG. 9 will be described in further detail. In the case of A, the conversion sort (correlating sort) of <Except red, all to be converted to "black"> has been set.

In the case of A, when the designated color designated by the printing command is classified to the classified color of "red" (classified color data Cnv=2), it has been set that the classified color is correlated to the printing color of "red" (printing color data Col=1. Refer to the description of FIG. 6) regardless of the data sets.

Concerning "red 2" and "red 3", since the red/red-2 border threshold value R1 and the red-2/red-3 border threshold value R2 for classifying these colors have been set to 0 (refer to FIG. 5) in the present embodiment, "red 2" and "red 3" are not discriminated from "red". Therefore, in the case of A in FIG. 9, when the designated color designated by the printing command is classified to the classified color of "red 2" or "red 3" (classified color data Cnv=6 or 7), it has been set that the classified color is correlated to the printing color of "red" (printing color data Col=1) regardless of the data sets.

Meanwhile, when the designated color designated by the printing command is classified to the classified color other than "red" (classified color data Cnv=0, 1, 3, 4 or 5), it has been set that the classified color is correlated to the printing color of "black" (printing color data Col=0. Refer to the description of FIG. 6) regardless of the data sets.

In the color setting data shown in FIG. 8, when the color detail of <Use halftone> is set to "ON" and the color detail of <Maintain original density> is set to "OFF" with respect to the printing color of "black" and the color detail of <Use halftone> is set to "ON" and the color detail of <Maintain original density> is set to "OFF" with respect to the printing color of "red", regardless of the "text data", "graphic data", and "image data", then the data set A0 is referred to in the case of A in FIG. 9.

In the data set of A0, since the color detail of <Maintain original density> is not performed for the printing colors of "black" and "red", "NO" is set to the term Dns of the original-density maintaining control process in each piece of the classified color data Cnv.

Further, in the data set of A0, since the color detail of <Use halftone> is set for the printing colors of "black" and "red", "YES" is set to the term Gra of the halftone controlling process in each piece of the classified color data Cnv.

But when the printing color is classified to the classified color, Cnv=0 ("Black"), the brightness L of "black" falls in a very narrow range from 0 to the black-color judgment threshold value Bla, and the halftone controlling process has no effect on the classified color of "black". Therefore, "NO" is set to the term Gra of the halftone controlling process in the classified color data Cnv=0.

Further, in the color setting data shown in FIG. 8, when the color detail of <Use halftone> is set to "ON" and the color detail of <Maintain original density> is also set to "ON" for the printing color of "black", and the color detail of <Use halftone> is set to "ON" and the color detail of <Maintain original density> is set to "OFF" for the printing color of "red", regardless of the "text data", "graphic data", and "image data", then the data set A1 is referred to in the case of A in FIG. 9. A difference between the data set A0 and the data set A1 is in that the color detail of <Maintain original density> is set to "ON" or is not set (or set to "OFF") for the printing color of "black". In the data set A1, the original-density maintaining control process is performed on the printing color of "black", on which the halftone controlling process is performed. Accordingly, for the classified colors (classified color data Cnv=1, 3, 4 and 5) to be correlated to the printing color of "black", "YES" is set to the terms Dns of the original-density maintaining control process in the data set A1. But since the term Gra of the halftone controlling process has been set to "NO" for the classified color of "black" (classified color data Cnv=0), the term Dns of density maintaining control process is also set to "NO" in the data set A1.

Hereinafter in the same manner, concerning each of the cases, A to D, shown in FIG. 9 to FIG. 12 and also each of the data sets, A0 to D4, it is possible to set a rule of correlating a classified color with a printing color (converting rule) as given in the color correlating-relationship information of FIG. 1.

Figure 13:
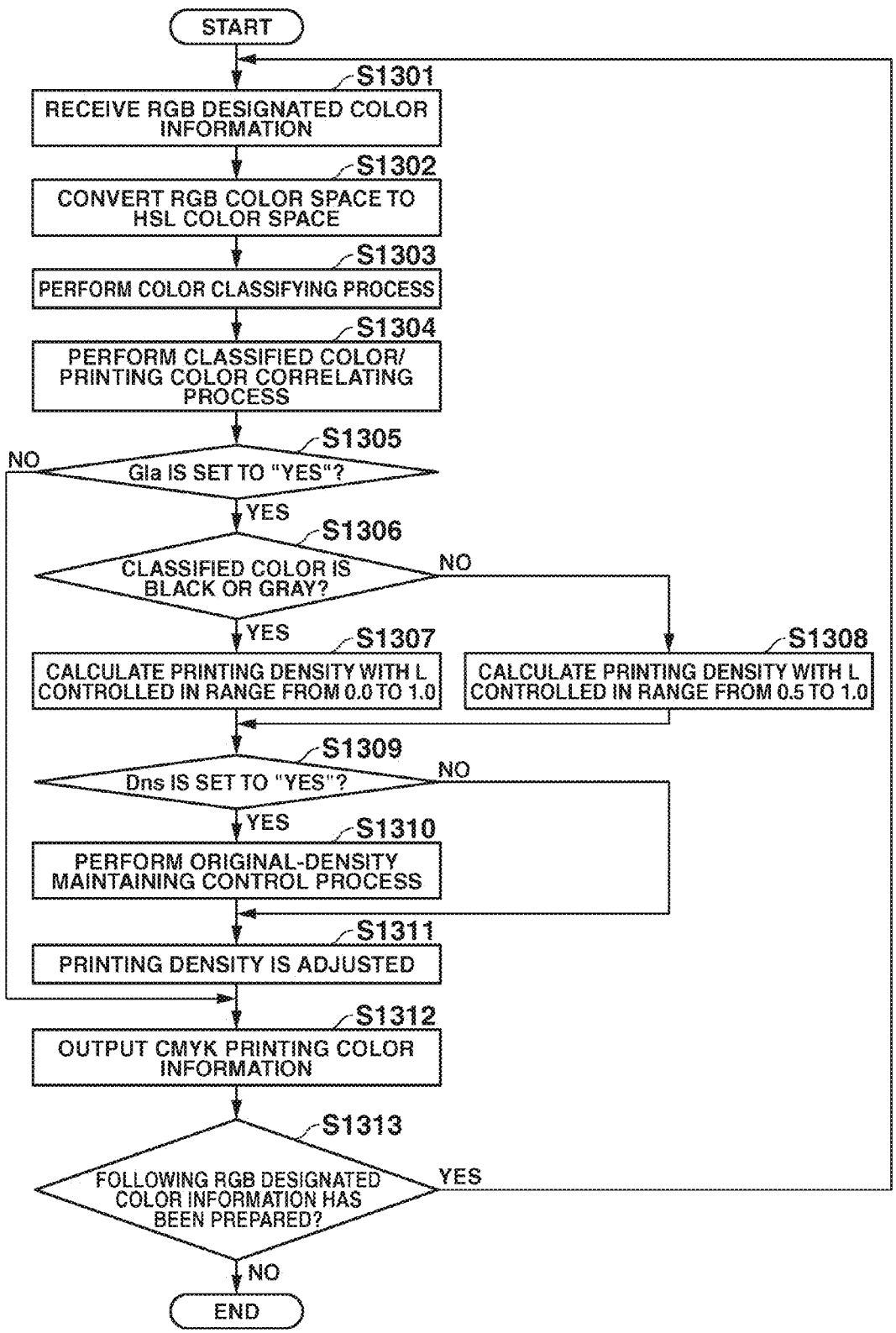
FIG. 13 is a flow chart of a color converting process performed in the present embodiment of the invention.

FIG. 13 is a flow chart of a color converting process performed by CPU 401 in the host computer 100 shown in FIG. 4. The color converting process is realized by the functions of the color-space converting unit 102, color classifying unit 103, classified-color/printing-color correlating unit 104, halftone controlling unit 105, original density retention controlling unit 106 of the printer driver 101 shown in FIG. 1. Using RAM 403 as the work memory, CPU 401 of FIG. 4 reads and runs the control program stored in ROM 402 or in the external storage device 407 to perform the color converting process. CPU 401 reads the printing commands one by one sent out from the application-software unit 108, thereby receiving color information designated by the printing commands, that is, RGB designated color information (step S1301 in FIG. 13).

RGB color space based on RGB designated color information received at step S1301 is converted to HSL color space (step S1302). HSL color space has been described with reference to FIG. 2. In HSL color space, conversions are effected by performing the following conversion formulas, where R, G and B denote R component value, G component value and B component value, respectively, and max (R, G, B) is a function, which outputs the maximum value among R component value, G component value and B component value, and min (R, G, B) is a function, which outputs the minimum value among R component value, G component value and B component value.

$$MAX = max(R,G,B)$$

$$MIN = min(R,G,B)$$

Brightness $L=(MAX+MIN)/2$

This brightness L is output.
In the case where MAX is equivalent to MIN,
saturation S=0 is output and
hue H=0 is output.
In the case where MAX is not equivalent to MIN, when brightness L≤0.5, saturation S=(MAX−MIN)/(MAX+MIN)
This saturation is output, and when brightness L>0.5, saturation S=(MAX−MIN)/(2−MAX−MIN)
This saturation is output.

$$Cr=(MAX-R)/(MAX-MIN)$$

$$Cg=(MAX-G)/(MAX-MIN)$$

$$Cb=(MAX-B)/(MAX-MIN)$$

If R component value is equivalent to MAX, then H=Cb−Cg
If G component value is equivalent to MAX, then H=2+Cr−Cb
If B component value is equivalent to MAX, then H=4+Cg−Cr $$H=60 \times H$$

If H<0, H=H+360
hue H is output.
The above process at step S1302 will realize the function of the color-space converting unit 102 of FIG. 1.

A color classifying process is performed on the converted color information, which consists of the brightness L, saturation S, and hue H obtained in the color-space converting process at step S1302 (step S1303). In the color classifying process at step S1303, the classifying process of FIGS. 3A and 3B is performed to realize the function of the color classifying unit 103. This color classifying process will be described with reference to a flow chart of FIG. 14 in further detail.

Then, a classified color/printing color correlating process is performed (step S1304). More specifically, the user operates on the color setting window shown by an example in FIG. 7 to refer to the color setting data stored in RAM 403 or in the external storage device 407 (FIG. 4), a sample of which data is shown in FIG. 8.

When the printing command for text data has been entered, the conversion sorts, which have been set concerning "text data" (FIG. 8), are read.

Further, the following four setting values, which have been set for the "text data", are obtained: for the printing color of "black", (1) whether the color detail of <Use halftone> has been set or not;
(2) whether the color detail of <Maintain original density> has been set or not;
and for the printing color of "red",
(3) whether the color detail of <Use halftone> has been set or not; and
(4) whether the color detail of <Maintain original density> has been set or not.

Then, a table, which meets the case corresponding to the obtained conversion sorts is designated from among the classified-color/printing-color correlating tables (FIG. 9 to FIG. 12) stored in RAM 403 or in the external storage device 407 (FIG. 4) and further, the data set which meets the obtained four setting values is designated in the designated table.

The printing color data Col, the term Gra of the halftone controlling process, and the term Dns of the original-density maintaining control process corresponding to the classified color Cnv designated at step S1303 are read in the designated data set.

The printing color corresponding to the read printing color data Col will be the printing color corresponding to the classified color data Cnv.

The above process at step S1304 will realize the function of the classified-color/printing-color correlating unit 104 shown in FIG. 1.

CPU 401 judges whether the term Gra of the halftone controlling process (step S1304) is "YES" or not (step S1305).

When the term Gra of the halftone controlling process is "NO", and it is determined NO at step S1305, the halftone controlling process and the original-density maintaining control process are not performed, and CPU 401 advances to step S1312.

When the term Gra of the halftone controlling process is "YES", and it is determined YES at step S1305, the halftone controlling process is performed.

CPU 401 judges whether the classified color classified in the color classifying process at step S1303 is either "black" or "gray" (Cnv=0 or 1) or not (step S1306).

When the classified color is either "black" or "gray" (Cnv=0 or 1) and it is determined YES at step S1306, the printing density of the printing color determined at step S1304 with the brightness L being controlled as a halftone over the whole range (0.0≤L≤1.0). More specifically, since the brightness L calculated at step S1302 L=0.0 corresponds to "black" and L=1.0 corresponds to "white", this state is inverted, bringing L=0.0 to "white" and L=1.0 to "black". The inverted value (1−L) is output as a calculated density value.

Meanwhile, when the classified color is neither "black" nor "gray", and it is determined NO at step S1306, the printing density of the printing color determined at step S1304 is determined with the brightness L being controlled as a halftone within an upper range (0.5≤L≤1.0). For example, "red" (RGB value: 255-0-0) corresponds to the brightness L=0.5 in HSL color space. In a two-color printing, the printing density of the printing color of "red" is adjusted to be 100% at the brightness L=0.5 to print this color of "red" with 100% of red toner. Since the brightness L=0.0 corresponds to "black" and L=1.0 corresponds to "white", the brightness L=1.0 to 0.5 corresponds to the printing density 0.0 (0%) to 1.0 (100%). The value converted in this way is output as the calculated density value.

The above series of processes at step S1305 to step S1308 will realize the function of the halftone controlling unit 105 of FIG. 1. In the process at step S1311, a toner-amount density value of the printing color is controlled based on the calculated density value in the series of processes, whereby a halftone printing will be performed.

Further, CPU 401 judges whether the term Dns of the original-density maintaining control process is set to "YES" or not (step S1309).

When the term Dns of the original-density maintaining control process is "NO", and it is determined NO at step S1309, the original-density maintaining control process is not performed, and CPU 401 advances to step S1311.

When the term Dns of the original-density maintaining control process is "YES", and it is determined YES at step S1309, the original-density maintaining control process is performed (step S1310).

In the case where the color detail of <Use halftone> has been set to "ON", when the intensity of the classified color is 100% for the color, the classified color is converted to the printing color in the halftone controlling process at step S1305 to S1308 such that the printing density of said printing color will be 100%. In almost all cases, the above conversion is acceptable, but some inconvenience can be caused by some printing data.

For example, as described above in the halftone controlling process, "red" (RGB value: 255-0-0) is controlled to be printed with the red toner of 100%. But when the classified colors of vivid red colors such as "red 2" and "red 3" are used in addition to the classified color of "red", the converted printing colors of "red", "red 2" and "red 3" make no difference in printing density. When "red" (RGB value: 255-0-0), "green" (RGB value: 0-255-0), and "yellow" (RGB value: 255-255-0) are used, the respective colors are converted to the printing colors of printing density of 100%, and therefore these colors make no difference in printing density. To avoid this inconvenience, when the color detail of <Maintain original density> is set to "ON", the intensity value calculated in the process at step S1307 or at step S1308 is multiplied by a coefficient corresponding to the classified color (step S1310). This coefficient is defined as follows:
in the case of the classified color of "black": 1.00;
in the case of the classified color of "gray": 1.00;
in the case of the classified color of "red": 0.70;
in the case of the classified color of "green": 0.41;
in the case of the classified color of "blue": 0.89;
in the case of the classified color of "yellow": 0.11.

For the classified colors of "red 2" and "red 3", the coefficients are calculated from the coefficient "1.00" for "black" and the coefficient "0.70" for "red", in accordance with the red/red-2 border threshold value R1 and the red-2/red-3 border threshold value R2, which are used to discriminate "red 2" and "red 3" from "red" (Refer to FIG. 5).

For example, "red" represented by RGB value: 255-192-192 is about at the brightness L=0.875. In this case, (1−0.875) is calculated as the calculated density value in the halftone controlling process. Further, this calculated density value (1−0.875) is multiplied by the coefficient 0.70 for the classified color of "red" in the original-density maintaining control process at step S1310, and then the calculated density value (=0.17) is output as the final calculated density value.

The processes at step S309 and step S1310 will realize the function of the original density retention controlling unit 106 of FIG. 1.

Then, the printing density of the printing color determined at step S1304 is adjusted in accordance with the calculated density value obtained in the halftone controlling process and the original-density maintaining control process (step S1311). More specifically, toner-amount density values of the respective stations C, M, Y and K for the printing color data Col corresponding to the printing color decided at step S1304 are read from the printing-color setting data stored in the external storage device 407 or in RAM 403 (FIG. 4). The example of the printing-color setting data is shown in FIG. 6. For instance, in the case of the printing color data Col=1 (red), the following toner-amount density values for the respective stations C, M, Y and K are obtained.

[C: 100%, M: 0%, Y: 0%, K: 0%]

Multiplying the above toner-amount density values for the respective stations C, M, Y and K by the calculated density value, the following toner-amount density values will be obtained:

[C: 17%, M: 0%, Y: 0%, K: 0%]

This CMYK printing color information is output in response to the current printing command, whereby the printer driver 101 of FIG. 1 executes an output process to an image memory area (step S1312).

Finally, CPU 401 judges whether RGB designated color information corresponding to the following printing command has been prepared (step S1313).

When the following RGB designated color information has been prepared (YES at step S1313), CPU 401 returns to step S1301, where the color converting process is performed on the following RGB designated color information.

When no following RGB designated color information has been prepared (NO at step S1313), the color converting process finishes in the current printing process.

Figure 14:
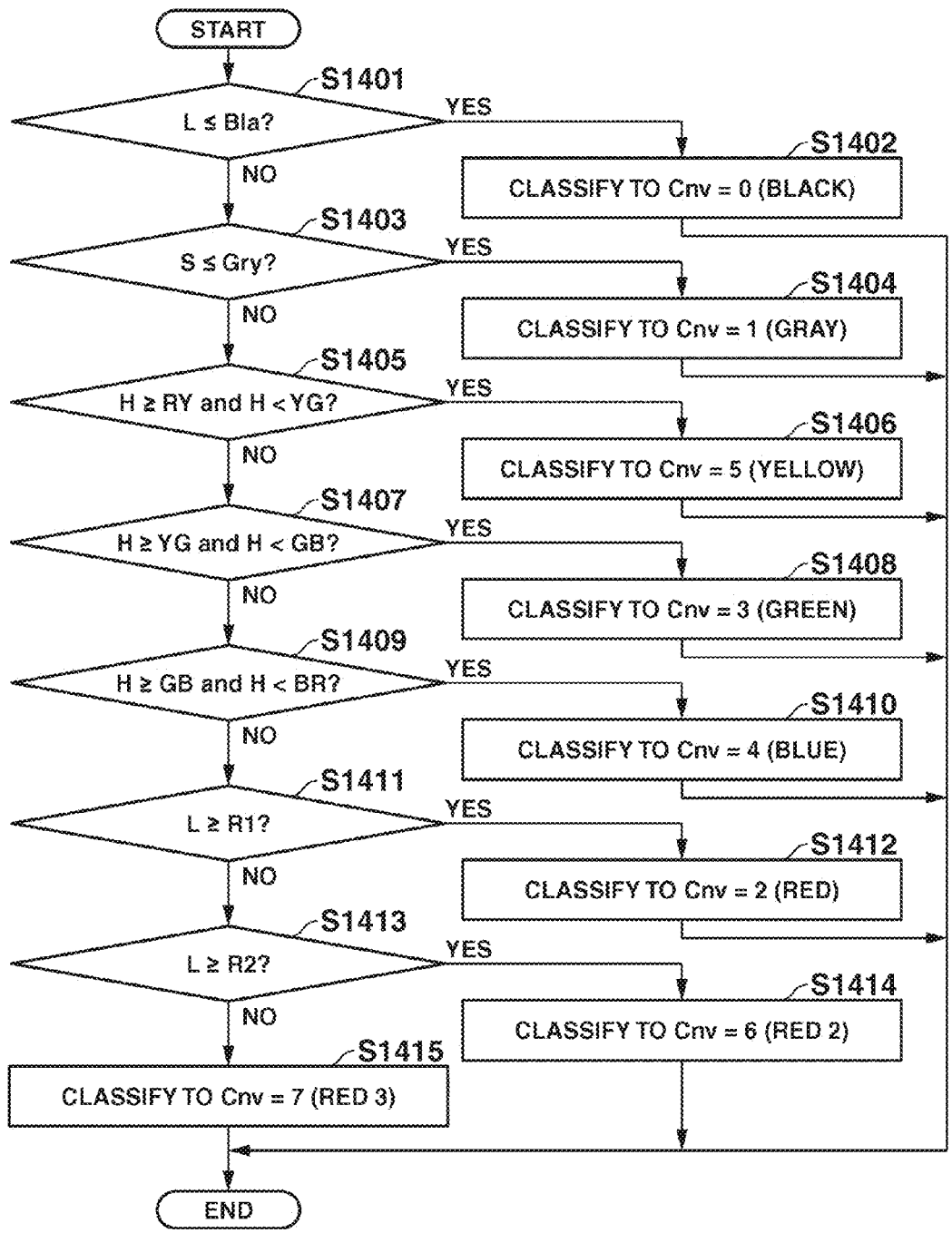
FIG. 14 is a flow chart of a color classifying process.

FIG. 14 is a flow chart of the color classifying process at step 1303 in FIG. 13. The color classifying process will be described with reference to FIG. 3A and FIG. 3B.

As shown in FIG. 3A, it is judged whether the brightness L of the color converted at step S1302 in FIG. 13 is equivalent to the black-color judgment threshold value Bla or less (step S1401 in FIG. 14).

When 0≤L≤Bla is true, and it is determined YES at step S1401, the converted color is classified to classified color data Cnv=0 ("black") (step S1402). The black-color judgment threshold value Bla is, for instance, about 0.01, as described above.

When L>Bla is true and it is determined NO at step S1401, CPU 401 judges whether the saturation S of the color converted at step S1302 in FIG. 13 is equivalent to the gray-color judgment threshold value Gry or less as shown in FIG. 3B (step S1403).

When 0≤S≤Gry is true and it is determined YES at step S1403, the converted color is classified to classified color data Cnv=1 ("gray") (step S1404). The gray-color judgment threshold value Gry is, for instance, about 0.01, as described above.

When S>Gry is true and it is determined NO at step S1403, CPU 401 judges whether the hue H of the color converted at step S1302 in FIG. 13 is equivalent to the red/yellow border threshold value RY or higher, and is less than the yellow/green border threshold value YG, as shown in FIG. 3B (step S1405).

When RY≤H<YG is true and it is determined YES at step S1405, the converted color is classified to classified color data Cnv=5 ("yellow") (step S1406). The red/yellow border threshold value RY is, for instance, about 52.5 deg., and the yellow/green border threshold value YG is, for instance, about 67.5 deg., as described above.

When H≥YG is true and it is determined NO at step S1405, CPU 401 judges whether the hue H of the color converted at step S1302 in FIG. 13 is equivalent to the yellow/green border threshold value YG or higher, and is less than the green/blue border threshold value GB, as shown in FIG. 3B (step S1407).

When YG≤H<GB is true and it is determined YES at step S1407, the converted color is classified to classified color data Cnv=3 ("green") (step S1408). The green/blue border threshold value GB is, for instance, about 180 deg., as described above.

When H≥GB is true and it is determined NO at step S1407, CPU 401 judges whether the hue H of the color converted at step S1302 in FIG. 13 is equivalent to the green/blue border threshold value GB or higher, and is less than the blue/red border threshold value BR, as shown in FIG. 3B (step S1409).

When GB≤H<BR is true and it is determined YES at step S1409, the converted color is classified to classified color data Cnv=4 ("blue") (step S1410). The blue/red border threshold value BR is, for instance, about 300 deg., as described above.

When H≥BR is true and it is determined NO at step S1409, CPU 401 judges whether the brightness L of the color converted at step S1302 in FIG. 13 is equivalent to the red/red-2 border threshold value R1 or higher (step S1411).

When L≥R1 is true and it is determined YES at step S1411, the converted color is classified to classified color data Cnv=2 ("red") (step S1412).

When L<R1 is true and it is determined NO at step S1411, CPU 401 judges whether the brightness L of the color converted at step S1302 in FIG. 13 is equivalent to the predetermined red-2/red-3 border threshold value R2 or higher (step S1413).

When R1>L≥R2 is true and it is determined YES at step S1413, the converted color is classified to classified color data Cnv=6 ("red 2") (step S1414).

When L<R2 is true and it is determined NO at step S1413, the converted color is classified to classified color data Cnv=7 ("red 3") (step S1415).

Figure 15:
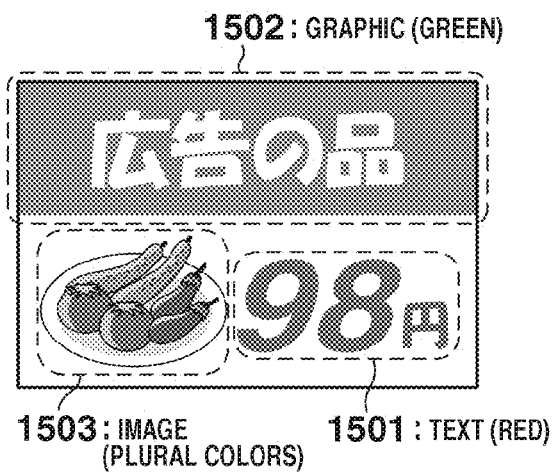
FIG. 15 is a view showing an example of data-for-printing to be processed in the color converting process in the present embodiment of the invention.

FIG. 15 is a view showing an example of data-for-printing to be processed in the color converting process in the present embodiment of the invention.

In FIG. 15, a reference number 1501 denotes text data of "red" color, a reference number 1502 denotes graphic data of "green" color, and a reference number 1503 denotes image data of plural colors. In FIG. 15, broken-line frames indicated by the reference numbers 1501, 1502 and 1503 are prepared for convenience of reference, and do not compose image data. The same shall apply in FIG. 16 to FIG. 23.

Figure 16:
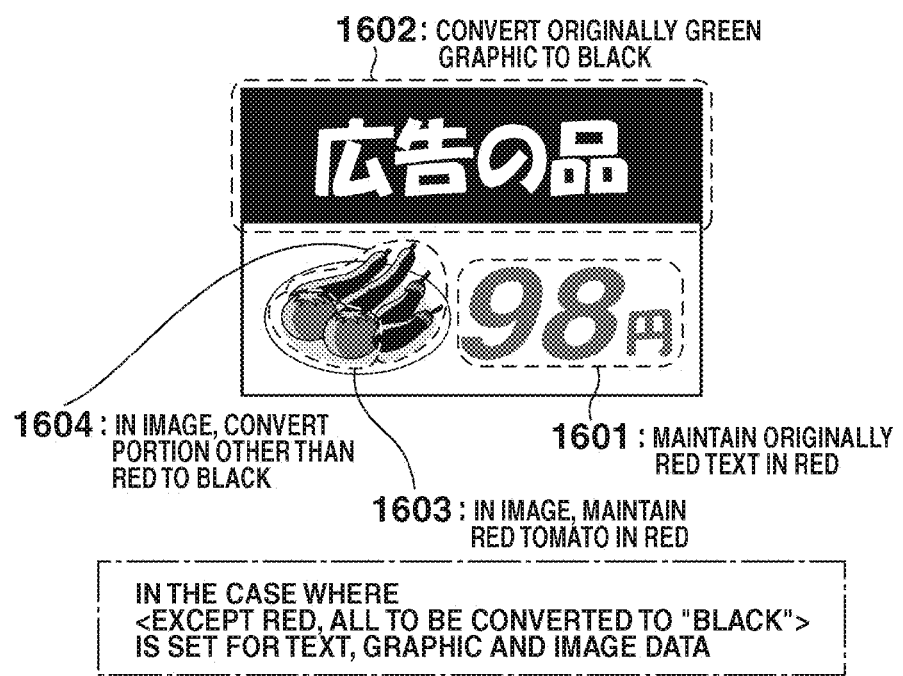
FIG. 16 is a view for explaining a printing process with <Except red, all to be converted to "black"> set previously, performed in the present embodiment of the invention.

FIG. 16 is a view showing an example of data-for-printing including text, graphic and image data (shown in FIG. 15), subjected to the color converting process, with the text, graphic and image data subjected to the printing process with the conversion sort of <Except red, all to be converted to "black"> set previously.

Concerning the text data 1601 of "red" color, the classified color data Cnv=2 is referred to in the classified-color/printing-color correlating table (case A) of FIG. 9, whereby the printing color data Col=1 ("red") is maintained.

Concerning the graphic data 1602 of "green" color, the classified color data Cnv=3 is referred to in the classified-color/printing-color correlating table (case A) of FIG. 9, whereby said "green" color is converted to the printing color data Col=0 ("black").

Concerning a tomato portion 1603 of "red" color in the image data, the classified color data Cnv=2 is referred to in the classified-color/printing-color correlating table (case A) of FIG. 9, whereby the printing color data Col=1 ("red") is maintained.

Concerning a portion 1604 other than the red portions in the image data, the classified color data other than Cnv=2 is referred to in the classified-color/printing-color correlating table (case A) of FIG. 9, whereby the portion 1604 is converted in color to the printing color data Col=0 ("black").

Figure 17:
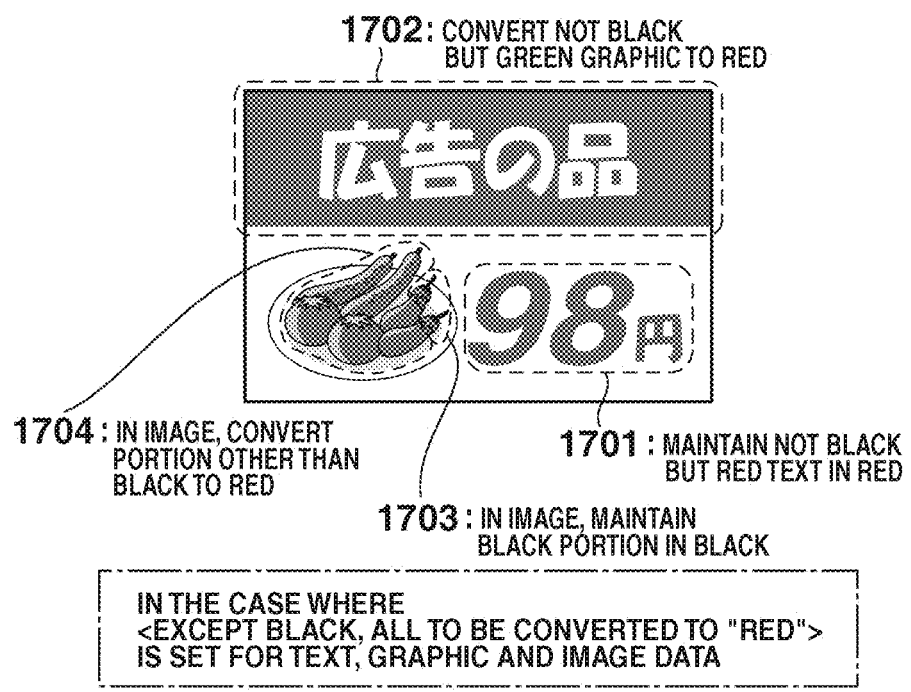
FIG. 17 is a view for explaining the printing process with <Except black, all to be converted to "red"> set previously, performed in the present embodiment of the invention.

FIG. 17 is a view showing an example of the data-for-printing including text, graphic and image data (shown in FIG. 15), subjected to the color converting process, with the text, graphic and image data subjected to the printing process with the conversion sort of <Except black, all to be converted to "red"> set previously.

Concerning the text data 1701 of "red" color but not "black" color, the classified color data Cnv=2 is referred to in the classified-color/printing-color correlating table (case B) of FIG. 10, whereby the printing color data Col=1 ("red") is maintained.

Concerning the graphic data 1702 of "green" color but not "black" color, the classified color data Cnv=3 is referred to in the classified-color/printing-color correlating table (case B) of FIG. 10, whereby said "green" color is correlated with the printing color data Col=1 ("red").

Concerning a portion 1703 of "black" color in the image data, the classified color data Cnv=0 is referred to in the classified-color/printing-color correlating table (case B) of FIG. 10, whereby the printing color data Col=0 ("black") is maintained.

Further, concerning a portion 1704 other than the black colored portion in the image data, the classified color data other than Cnv=0 is referred to in the classified-color/printing-color correlating table (case B) of FIG. 10, whereby the portion 1704 is correlated with the printing color data Col=1 ("red").

Figure 18:
FIG. 18 is a view showing an example of the data-for-printing subjected to the color converting process, with text and graphic data subjected to the printing process with <Except black, all to be converted to "red"> set and the image data subjected to the printing process with <All to be converted to "black"> set.

FIG. 18 is a view showing an example of the data-for-printing including text, graphic and image data (shown in FIG. 15), subjected to the color converting process, with the text and graphic data subjected to the printing process with the conversion sort of <Except black, all to be converted to "red"> set previously and the image data subjected to the printing process with the conversion sort of <All to be converted to "black"> set previously.

Concerning the text data 1801 of "red" color but not "black" color, the classified color data Cnv=2 is referred to in the classified-color/printing-color correlating table (case B) of FIG. 10, whereby the printing color data Col=1 ("red") is maintained.

Concerning the graphic data 1802 of "green" color but not "black" color, the classified color data Cnv=3 is referred to in the classified-color/printing-color correlating table (case B) of FIG. 10, whereby said "green" color is correlated with the printing color data Col=1 ("red").

Concerning the image data 1803, all the classified color data Cnv is referred to in the classified-color/printing-color correlating table (case C) of FIG. 11, whereby the image data is correlated with the printing color data Col=0 ("black").

Figure 19:
FIG. 19 is a view showing an example of the data-for-printing subjected to the color converting process, with the text data subjected to the printing process with <All to be converted to "red"> set and with the image and graphic data subjected to the printing process with <All to be converted to "black"> set.

FIG. 19 is a view showing an example of the data-for-printing including text, graphic and image data (shown in FIG. 15), subjected to the color converting process, with the text data subjected to the printing process with the conversion sort of <All to be converted to "red"> set previously and with the image and graphic data subjected to the printing process with the conversion sort of <All to be converted to "black"> set previously.

Concerning the text data 1901, all the classified color data Cnv is referred to in the classified-color/printing-color correlating table (case D) of FIG. 12, whereby the text data is correlated with the printing color data Col=1 ("red").

Further, concerning the graphic data 1902 and the image data 1903, all the classified color data Cnv is referred to in the classified-color/printing-color correlating table (case C) of FIG. 11, whereby the graphic data and image data are correlated with the printing color data Col=0 ("black").

Figure 20:
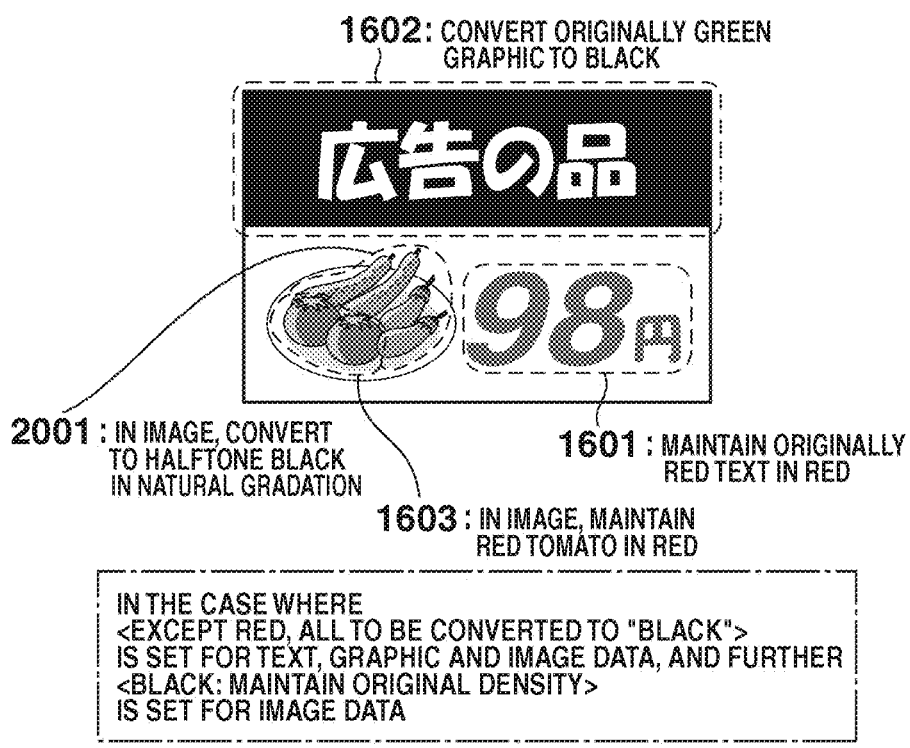
FIG. 20 is a view showing an example of the text, graphic and image data subjected to color converting process, with all the data subjected to the printing process with <Except red, all to be converted to "black"> set and further the image data subjected to the process with <Black: Maintain original density> set.

FIG. 20 is a view showing an example of the text, graphic and image data in the present embodiment, which are subjected to color converting process, with all the data subjected to the printing process with the conversion sort of <Except red, all to be converted to "black"> set previously and further the image data is subjected to the process with the color detail of <Black: Maintain original density> set previously.

Fundamentally, this case is substantially the same as the case shown in FIG. 16. The data set A1 of FIG. 9 is designated, and the values of "YES" are read from the terms Gra of the halftone controlling process and from the terms Dns of the original-density maintaining control process in the classified color data Cnv other than Cnv=2 correlated with the printing color "black" in the image. Then, the original-density maintaining control process is performed at step S1309 to step S1310 in FIG. 13. As a result, the printing color of a halftone black in the image to be is converted in a natural gradation.

Figure 21:
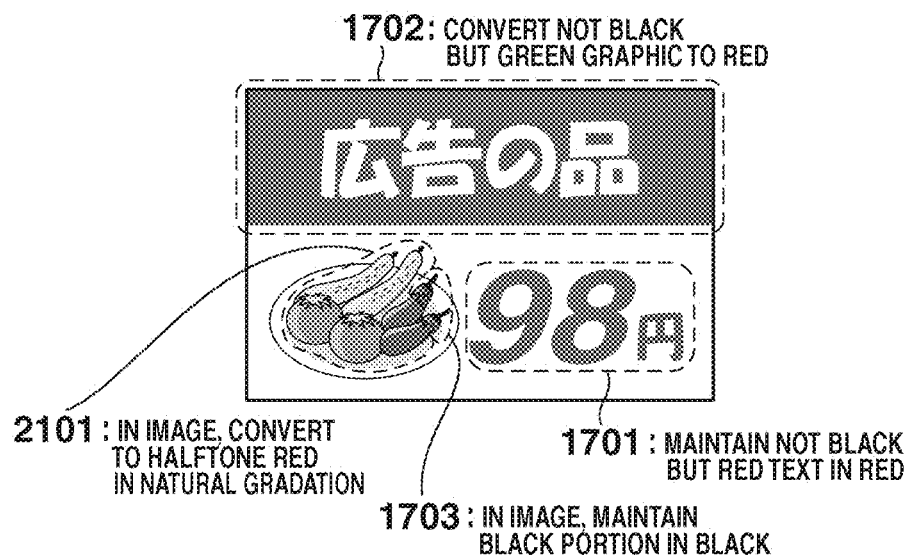
FIG. 21 is a view showing an example of the text, graphic and image data, subjected to the color converting process, with all the data subjected to the printing process with <Except black, all to be converted to "red"> set and further with the image data subjected to the process with <Red: Maintain original density> set.

FIG. 21 is a view showing an example of the text data, graphic data and image data, subjected to the color converting process, with all the data subjected to the printing process with the conversion sort of <Except black, all to be converted to "red"> set previously and further with the image data subjected to the process with the color detail of <Red: Maintain original density> set previously.

Fundamentally, this case is substantially the same as the case shown in FIG. 17. The data set B3 of FIG. 10 is designated, the values "YES" are read from the terms Gra of the halftone controlling process and the terms Dns of the original-density maintaining control process in the classified color data Cnv=2 correlated with the printing color of red in the image. Then, the original-density maintaining control process is performed at step S1309 to step S1310 in FIG. 13. As a result, the printing color of a halftone red in the image is converted in a natural gradation.

Figure 22:
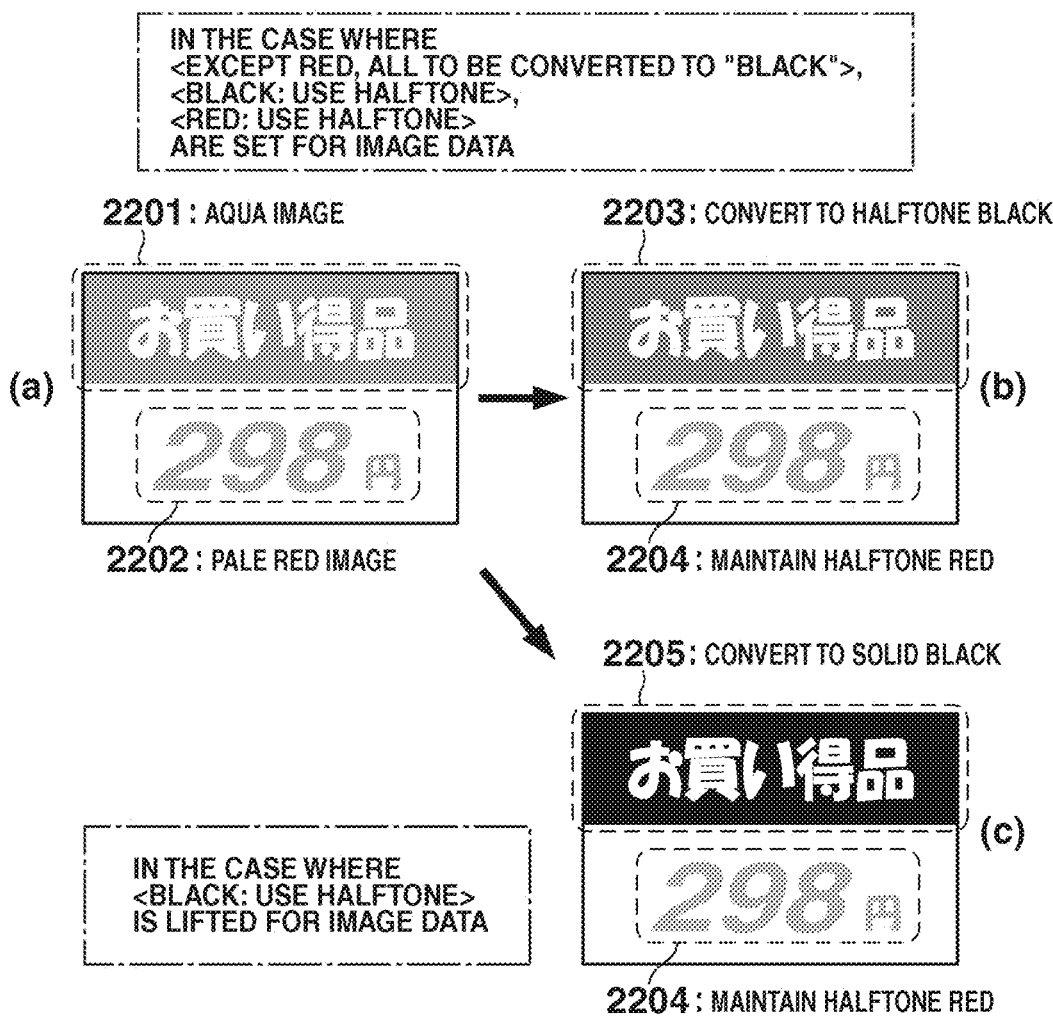
FIG. 22 is a view (No. 1) for explaining a halftone process performed in the present embodiment of the invention.

FIG. 22 is a view (No. 1) for explaining a halftone process performed in the present embodiment of the invention. In FIG. 22, an example of the data-for-printing is shown, which is subjected to the color converting process, with the image data subjected to the printing process with the conversion sort of <Except red, all to be converted to "black"> set previously and further with the image data subjected to the process with the color details of <Black: Use halftone> and <Red: Use halftone> set previously.

"Aqua" image data 2201 and pale "red" image data 2202 in the data-for-printing shown at (a) in FIG. 22 are correlated with halftone "black" image data 2203 and halftone "red" image data 2204 respectively, as shown at (b) in FIG. 22.

Meanwhile, in the case where the color detail of <Black: Use halftone> is lifted, the halftone "black" image data 2203 can be altered to solid "black" image data 2205 as shown at (c) in FIG. 22.

Figure 23:
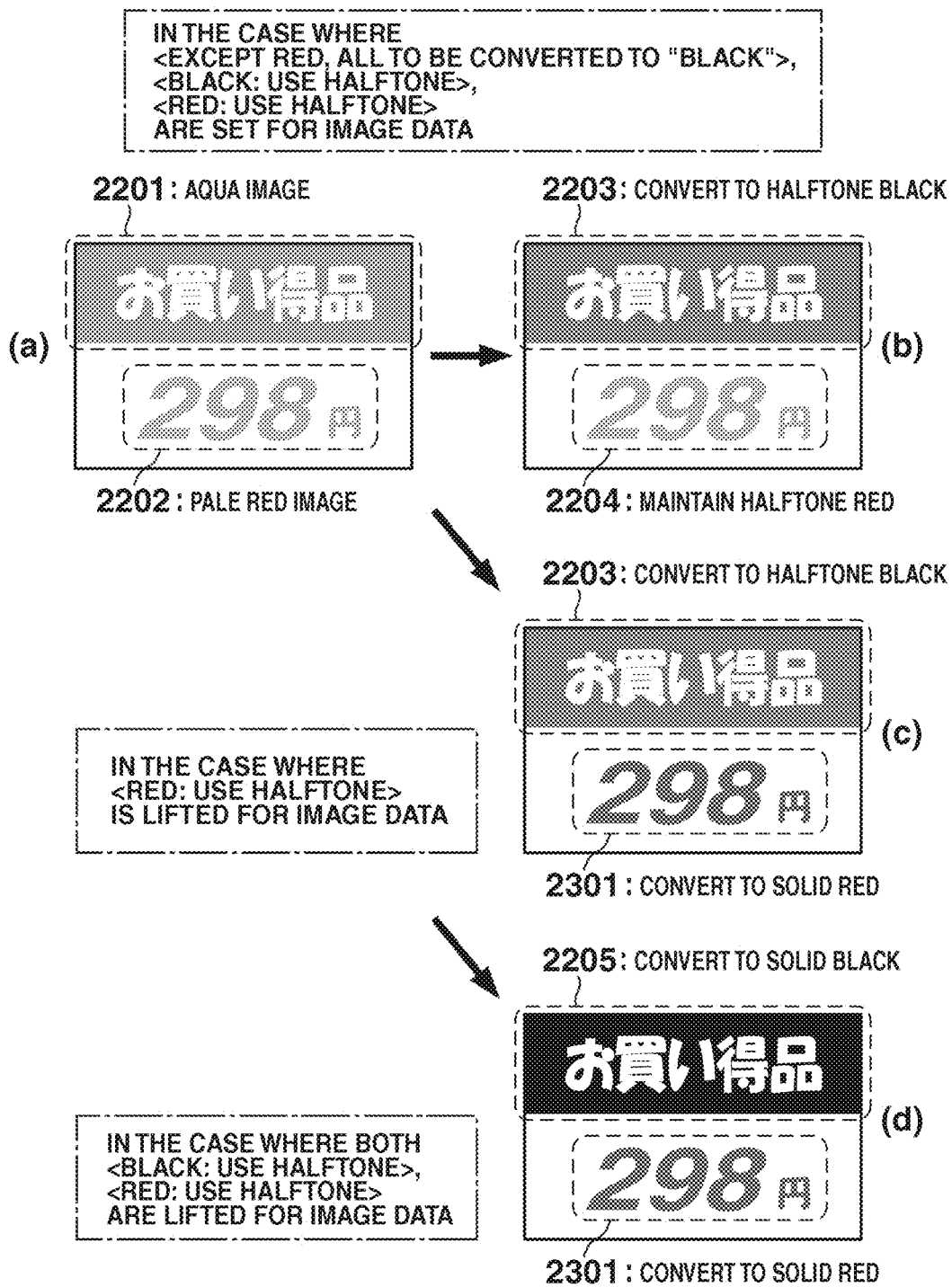
FIG. 23 is another view (No. 2) for explaining the halftone process performed in the present embodiment of the invention.

FIG. 23 is another view (No. 2) for explaining the halftone process performed in the present embodiment of the invention. In FIG. 23, another example of the data-for-printing is shown, which is subjected to the color converting process, with the image data subjected to the printing process with the conversion sort of <Except red, all to be converted to "black"> set previously and further with the image data subjected to the process with the color details of <Black: Use halftone> and <Red: Use halftone> set previously.

"Aqua" image data 2201 and pale red image data 2202 in the data-for-printing shown at (a) in FIG. 23 are correlated with halftone "black" image data 2203 and halftone "red" image data 2204 respectively, as shown at (b) in FIG. 23, in the same manner as in the case shown in FIG. 22.

Meanwhile, in the case where the color detail of <Red: Use halftone> is lifted, the halftone "red" image data 2204 can be converted to solid "red" image data 2301 as shown at (c) in FIG. 23.

Further, in the case where both the color details of <Black: Use halftone> and <Red: Use halftone> are lifted, the halftone "black" image data 2203 and the halftone "red" image data 2204 can be changed to solid "black" image data 2205 and solid "red" image data 2301 respectively, as shown at (d) in FIG. 23.

As described above, concerning the data-for-printing, in which plural colors are designated by the printing commands, the user is allowed to designate riot of colors for printing according to his/her desire.

What is claimed is:

1. A color converting apparatus for designated-color printing, the color converting apparatus comprising:
   a CPU which is operable as:
      a color space converting unit which converts a designated-color designated by a printing command to a converted-color in a color space represented by brightness, saturation, and hue of color;
      a color classifying unit which classifies the converted-color to one of plural classified-colors based on the brightness, saturation, and hue of said converted-color;
      a classified-color/printing-color correlating unit which selects one printing color correlated with the one classified-color from among one or more printing colors, based on color correlating-relationship information, wherein the color correlating-relationship information sets a correlating relationship between the plural classified-colors and one or more printing colors, and correlates the selected printing color with said printing command;
      a halftone controlling unit which calculates a first printing density of the one printing color based on the brightness of the classified-color in the color space and sets the calculated first printing density to the one printing color; and
      a color determining unit which determines whether the classified-color is one of black and gray;
      wherein the halftone controlling unit (i) calculates the first printing density with a whole range of the brightness being controlled as a halftone in a case in which the color determining unit determines that the classified-color is one of black and gray, and (ii) calculates the first printing density with a partial range of the whole range of the brightness being controlled in a case in which the color determining unit determines that the classified-color is not one of black and gray.

2. The color converting apparatus according to claim 1, wherein the CPU is further operable as a color correlating-relationship information setting unit which sets the color correlating-relationship information.

3. The color converting apparatus according to claim 1, wherein the CPU is further operable as an original-density maintain controlling unit which, in a case in which it is set that an original density of the one classified-color is to be maintained, multiplies the first printing density calculated by the halftone controlling unit by a coefficient to obtain a second printing density and sets the obtained second printing density to the one printing color.

4. The color converting apparatus according to claim 3, wherein the CPU is further operable as an original-density maintain setting unit which decides whether or not the original density of the one classified-color is to be maintained.

5. The color converting apparatus, according to claim 1, wherein the color classifying unit (i) classifies the converted-color to a classified-color of a black color, when the brightness of the converted-color in the color space is not larger than a predetermined threshold value of brightness, and classifies the converted-color to a classified-color of a gray color, when the brightness of the converted-color in the color space is equivalent to the predetermined threshold value of brightness or larger, and further the saturation of the converted-color in the color space is not larger than a predetermined threshold value of saturation, and (ii) classifies the converted-color to one classified-color other than classified-colors of a black color and/or a gray color from among plural classified colors, based on the hue of the converted-color in the color space, when the brightness of the converted-color in the color space is equivalent to the predetermined threshold value of brightness or larger, and further the saturation of the converted-color in the color space is larger than the predetermined threshold value of saturation.

6. A method of converting color for designated-color printing, the method comprising:
   a color-space converting step of converting a designated-color designated by a printing command to a converted-color in a color space represented by brightness, saturation, and hue of color;
   a color classifying step of classifying the converted-color to one of plural classified-colors based on the brightness, saturation, and hue of said converted-color;
   a classified-color/printing-color correlating step of selecting one printing color correlated with the one classified-color from among one or more printing colors, based on color correlating-relationship information, wherein the color correlating-relationship information sets a correlating relationship between the plural classified-colors and one or more printing colors, and of correlating the selected printing color with said printing command;
   a halftone controlling step of calculating a first printing density of the one printing color based on the brightness of the classified-color in the color space and setting the calculated first printing density to the one printing color; and
   a color determining step of determining whether the classified-color is one of black and gray;
   wherein the halftone controlling step comprises (i) calculating the first printing density with a whole range of the brightness being controlled as a halftone in a case in which the color determining step determines that the classified-color is one of black and gray, and (ii) calculating the first printing density with a partial range of the whole range of the brightness being controlled in a case in which the color determining step determines that the classified-color is not one of black and gray.

7. A non-transitory computer-readable storage medium with an executable program stored thereon, wherein the program is executable to control a computer to perform functions comprising:
   a color-space converting step of converting a designated-color designated by a printing command to a converted-color in a color space represented by brightness, saturation, and hue of color;
   a color classifying step of classifying the converted-color to one of plural classified-colors based on the brightness, saturation, and hue of said converted-color;
   a classified-color/printing-color correlating step of selecting one printing color correlated with the one classified-color from among one or more printing colors, based on color correlating-relationship information, wherein the color correlating-relationship information sets a correlating relationship between the plural classified-colors and one or more printing colors, and of correlating the selected printing color with said printing command;

a halftone controlling step of calculating a first printing density of the one printing color based on the brightness of the classified-color in the color space and setting the calculated first printing density to the one printing color; and a color determining step of determining whether the classified-color is one of black and gray;

wherein the halftone controlling step comprises (i) calculating the first printing density with a whole range of the brightness being controlled as a halftone in a case in which the color determining step determines that the classified-color is one of black and gray, and (ii) calculating the first printing density with a partial range of the whole range of the brightness being controlled in a case in which the color determining step determines that the classified-color is not one of black and gray.

8. The color converting apparatus according to claim 1, wherein the halftone controlling unit calculates the first printing density based on the partial range of the whole range of the brightness, a lower limit of which is greater than or equal to a predetermined brightness value, in a case in which the color determining unit determines that the classified-color is not one of black and gray.

* * * * *